(12) United States Patent
Paskover et al.

(10) Patent No.: US 12,487,190 B2
(45) Date of Patent: Dec. 2, 2025

(54) SYSTEM AND METHOD FOR ISOLATION OF SPECIFIC FOURIER PUPIL FREQUENCY IN OVERLAY METROLOGY

(71) Applicant: KLA Corporation, Milpitas, CA (US)

(72) Inventors: Yuri Paskover, Milpitas, CA (US); Itay Gdor, Tel-Aviv (IL); Yuval Lubashevsky, Haifa (IL); Vladimir Levinski, Nazareth Ilit (IL); Alexander Volfman, Milpitas, CA (US); Yoram Uziel, Milpitas, CA (US); Yevgeniy Men, Milpitas, CA (US)

(73) Assignee: KLA Corporation, Milpitas, CA (US)

( * ) Notice: Subject to any disclaimer, the term of this patent is extended or adjusted under 35 U.S.C. 154(b) by 473 days.

(21) Appl. No.: 17/709,200

(22) Filed: Mar. 30, 2022

(65) Prior Publication Data
US 2023/0314344 A1 Oct. 5, 2023

(51) Int. Cl.
*G01N 21/956* (2006.01)
*G01B 11/27* (2006.01)
(Continued)

(52) U.S. Cl.
CPC ......... *G01N 21/956* (2013.01); *G01B 11/272* (2013.01); *G01N 21/4788* (2013.01); *G01N 21/8806* (2013.01); *G01B 2210/56* (2013.01)

(58) Field of Classification Search
CPC ............. G01N 21/956; G01N 21/4788; G01N 21/8806; G01B 11/272; G01B 2210/56; G03F 7/706851; G03F 7/70633
(Continued)

(56) References Cited

U.S. PATENT DOCUMENTS

| 4,947,413 A | 8/1990 | Jewell et al. |
| 5,216,257 A | 6/1993 | Brueck et al. |

(Continued)

FOREIGN PATENT DOCUMENTS

| CN | 104346808 A | 2/2015 |
| CN | 111766764 A | 10/2020 |

(Continued)

OTHER PUBLICATIONS

Korean Intellectual Property Office, International Search Report and Written Opinion for International Application No. PCT/US2022/052061, Apr. 24, 2023, 10 pages.

(Continued)

*Primary Examiner* — Md M Rahman
(74) *Attorney, Agent, or Firm* — Suiter Swantz IP

(57) ABSTRACT

A system includes an illumination source configured to generate an illumination beam, and a collection sub-system that includes an objective lens, one or more detectors located at a collection pupil plane, a light modulator, and a controller. The light modulator is configured to direct one or more selected portions of measurement light to the one or more detectors. The controller includes one or more processors configured to execute program instructions causing the one or more processors to execute a metrology recipe by: receiving detection signals from the one or more detectors, wherein the detection signals are associated with the one or more selected portions of the measurement light directed to the one or more detectors; and generating an overlay measurement associated with at least two layers of a sample based on the detection signals.

26 Claims, 9 Drawing Sheets

(51) Int. Cl.
*G01N 21/47* (2006.01)
*G01N 21/88* (2006.01)

(58) Field of Classification Search
USPC ........................................................ 356/369
See application file for complete search history.

(56) References Cited

U.S. PATENT DOCUMENTS

| | | | |
|---|---|---|---|
| 5,414,514 | A | 5/1995 | Smith et al. |
| 5,808,731 | A | 9/1998 | Kirk |
| 5,895,735 | A | 4/1999 | Yoon |
| 5,914,204 | A | 6/1999 | Lee |
| 6,958,819 | B1 | 10/2005 | Heaton et al. |
| 7,247,843 | B1 | 7/2007 | Moon |
| 7,440,105 | B2 | 10/2008 | Adel et al. |
| 7,602,491 | B2 | 10/2009 | Kandel et al. |
| 7,671,990 | B1 | 3/2010 | Adel et al. |
| 8,786,825 | B2 | 7/2014 | Kerkhof et al. |
| 9,123,649 | B1 | 9/2015 | Manassen et al. |
| 9,864,209 | B2 | 1/2018 | Levinski et al. |
| 9,885,961 | B1 | 2/2018 | Amir |
| 10,197,389 | B2 | 2/2019 | Levinski et al. |
| 10,268,125 | B2 | 4/2019 | Peng et al. |
| 10,437,163 | B2 | 10/2019 | Schaar et al. |
| 10,488,768 | B2 | 11/2019 | Auer et al. |
| 10,527,952 | B2 | 1/2020 | Grunzweig et al. |
| 10,585,357 | B2 | 3/2020 | Schaar et al. |
| 10,606,178 | B2 | 3/2020 | Zwier |
| 10,691,030 | B2 | 6/2020 | Staals et al. |
| 10,824,079 | B2 | 11/2020 | Lubashevsky et al. |
| 10,983,005 | B2 | 4/2021 | Wu et al. |
| 11,073,768 | B2 | 7/2021 | Hill et al. |
| 11,112,369 | B2 | 9/2021 | Gready |
| 11,119,417 | B2 | 9/2021 | Manassen et al. |
| 11,164,307 | B1 | 11/2021 | Feler et al. |
| 11,300,405 | B2 | 4/2022 | Manassen et al. |
| 11,300,524 | B1 | 4/2022 | Hill et al. |
| 11,353,799 | B1 | 6/2022 | Volkovich et al. |
| 11,378,394 | B1 | 7/2022 | Paskover et al. |
| 11,428,642 | B2 | 8/2022 | Hill et al. |
| 11,526,086 | B2 | 12/2022 | Hill et al. |
| 11,604,149 | B2 | 3/2023 | Feler |
| 11,796,925 | B2 | 10/2023 | Lubashevsky et al. |
| 2001/0021477 | A1 | 9/2001 | Dirksen et al. |
| 2002/0080364 | A1 | 6/2002 | Monshouwer et al. |
| 2004/0169861 | A1 | 9/2004 | Mieher et al. |
| 2005/0018190 | A1 | 1/2005 | Sezginer et al. |
| 2005/0195398 | A1 | 9/2005 | Adel et al. |
| 2007/0077503 | A1 | 4/2007 | Yoo |
| 2007/0234786 | A1 | 10/2007 | Moon |
| 2007/0242272 | A1 | 10/2007 | Suehira et al. |
| 2007/0279630 | A1 | 12/2007 | Kandel et al. |
| 2009/0042108 | A1 | 2/2009 | Yasuzato |
| 2010/0267682 | A1 | 10/2010 | Johri et al. |
| 2010/0277706 | A1 | 11/2010 | Schaar et al. |
| 2011/0122496 | A1 | 5/2011 | Schaar et al. |
| 2012/0033193 | A1 | 2/2012 | Schaar et al. |
| 2012/0253325 | A1 | 10/2012 | Sniffin et al. |
| 2013/0032712 | A1 | 2/2013 | Shih et al. |
| 2013/0193602 | A1 | 8/2013 | Suzuki et al. |
| 2013/0252429 | A1 | 9/2013 | Okamoto et al. |
| 2013/0300999 | A1* | 11/2013 | DeJong ............... H04N 9/3129 351/158 |
| 2014/0065736 | A1 | 3/2014 | Amir et al. |
| 2014/0240704 | A1 | 8/2014 | Komine et al. |
| 2015/0138523 | A1 | 5/2015 | Jak et al. |
| 2015/0177135 | A1 | 6/2015 | Amit et al. |
| 2015/0235880 | A1 | 8/2015 | Inada et al. |
| 2015/0293458 | A1 | 10/2015 | Vanoppen et al. |
| 2016/0047744 | A1 | 2/2016 | Adel et al. |
| 2016/0093574 | A1 | 3/2016 | Cai et al. |
| 2016/0146740 | A1 | 5/2016 | Lu et al. |
| 2016/0223920 | A1 | 8/2016 | Tinnemans et al. |
| 2016/0300767 | A1 | 10/2016 | Ko et al. |
| 2017/0146338 | A1 | 5/2017 | Allen |
| 2017/0307367 | A1 | 10/2017 | Yaegashi et al. |
| 2017/0351184 | A1 | 12/2017 | Peng et al. |
| 2018/0024054 | A1 | 1/2018 | Moon et al. |
| 2018/0246420 | A1 | 8/2018 | Pandey et al. |
| 2019/0004439 | A1 | 1/2019 | Lubashevsky et al. |
| 2019/0033726 | A1 | 1/2019 | Adam et al. |
| 2019/0049373 | A1 | 2/2019 | Levinski |
| 2019/0101835 | A1 | 4/2019 | Chen |
| 2019/0219931 | A1 | 7/2019 | Zwier |
| 2019/0285407 | A1 | 9/2019 | Chuang et al. |
| 2019/0285996 | A1 | 9/2019 | Shibayama et al. |
| 2019/0354024 | A1 | 11/2019 | Tsiatmas et al. |
| 2020/0132446 | A1 | 4/2020 | Shalibo et al. |
| 2020/0241429 | A1 | 7/2020 | Yang et al. |
| 2021/0072650 | A1 | 3/2021 | Feler et al. |
| 2021/0364279 | A1 | 11/2021 | Manassen et al. |
| 2021/0364935 | A1 | 11/2021 | Gdor et al. |
| 2022/0034652 | A1 | 2/2022 | Manassen et al. |
| 2022/0252990 | A1 | 8/2022 | Javaheri et al. |
| 2023/0133640 | A1 | 5/2023 | Hill et al. |
| 2023/0213875 | A1 | 7/2023 | Lubashevsky et al. |
| 2023/0314319 | A1 | 10/2023 | Manassen et al. |
| 2024/0068804 | A1 | 2/2024 | Lubashevsky et al. |
| 2024/0167813 | A1 | 5/2024 | Gdor et al. |
| 2024/0280914 | A1 | 8/2024 | Manassen et al. |
| 2024/0302751 | A1 | 9/2024 | Pio et al. |
| 2024/0337952 | A1 | 10/2024 | Gdor et al. |
| 2024/0337953 | A1 | 10/2024 | Gdor et al. |

FOREIGN PATENT DOCUMENTS

| | | |
|---|---|---|
| JP | 214765 Y1 | 8/1998 |
| JP | 10214765 A | 11/1998 |
| JP | 2001093820 A | 4/2001 |
| JP | 2002134394 A | 5/2002 |
| JP | 2004006895 A | 1/2004 |
| JP | 2007140460 | 2/2009 |
| JP | 2010267682 A | 11/2010 |
| JP | 2011243664 A | 12/2011 |
| JP | 2012253325 A | 12/2012 |
| JP | 2013074258 A | 4/2013 |
| JP | 2013254780 | 7/2015 |
| JP | 2015154008 A | 8/2015 |
| KR | 101185992 B1 | 9/2012 |
| KR | 20150121275 A | 10/2015 |
| KR | 1020160121206 A | 10/2016 |
| KR | 1020230128002 A | 9/2023 |
| WO | 2022020402 A1 | 1/2022 |
| WO | 2022031565 A1 | 2/2022 |

OTHER PUBLICATIONS

U.S. Appl. No. 17/119,536, filed Dec. 11, 2020, Paskover et al.
U.S. Appl. No. 17/140,999, filed Jan. 4, 2021, Hill et al.
U.S. Appl. No. 17/142,783, filed Jan. 6, 2021, Hill et al.
U.S. Appl. No. 17/708,958, filed Mar. 30, 2022, manassen et al.
U.S. Appl. No. 17/709,104, filed Mar. 30, 2022, Lubashevsky et al.
Adel, Mike et al., "Diffraction order control in overlay metrology: a review of the roadmap options," Proc. SPIE. 6922, Metrology, Inspection, and Process Control for Microlithography XXII, 692202 (2008).
Korean Intellectual Property Office, International Search Report and Written Opinion for International Application No. PCT/US2023/013654, Jun. 8, 2023, 12 pages.
Korean Intellectual Property Office, International Search Report and Written Opinion for International Application No. PCT/US2023/014005, Jun. 16, 2023, 8 pages.
Zhou et al., "Moiré-Based Interferometry for Magnification Calibration of Bitelecentric Lens System," IEEE Photonics Journal, vol. 7, No. 6, Dec. 2015, 12 pages.
U.S. Appl. No. 18/099,798, filed Jan. 20, 2023, Gdor et al.
U.S. Appl. No. 18/110,746, filed Feb. 16, 2023, Manassen et al.
U.S. Appl. No. 18/230,542, filed Aug. 4, 2023, Jordan Pio.
U.S. Appl. No. 18/234,773, filed Aug. 16, 2023, Yuval Lubashevsky.
U.S. Appl. No. 18/372,444, filed Sep. 25, 2023, Itay Gdor.
U.S. Appl. No. 18/372,531, filed Sep. 25, 2023, Itay Gdor.

(56) References Cited

OTHER PUBLICATIONS

Adel et al., "Diffraction order control in overlay metrology: a review of the roadmap options," Proc. SPIE. 6922, Metrology, Inspection, and Process Control for Microlithography XXII, pp. 692202-1 to 692202-19, Apr. 2008.

International Search Report and Written Report in International Application No. PCT/US2021/061296 dated Mar. 24, 2022, 9 pages.

PCT International Search Report and Written Opinion for International Application No. PCT/US2021/044111 dated Nov. 22, 2022, 9 pages.

Buttgereit, et al., "Phame(R)—high resolution off-axis phase shift measurements on 45nm node features," 24th European Mask and Lithography Conference, 2008, pp. 1-7, doi: 10.1117/12.798805.

Di, et al., "Moiré-Based Absolute Interferometry With Large Measurement Range in Wafer-Mask Alignment", IEEE Photonics Technology Letters, vol. 27, No. 4, pp. 435-438, 2015. doi:10.1109/LPT.2014.2377037.

Fesperman Jr., Ronnie Rex, (2006). Multiscale Alignment and Positioning System. (UMI 3264369) [Doctor of Philosophy, University of North Carolina] ProQuest Information and Learning Company.

Kikuchi et al., "Principle and observation of fluorescence moiré fringes for alignment in print and imprint methods" J. Vac. Sci. Technol. B 35, 06G303 (2017); https://doi.org/10.1116/1.4990844, Submitted: Jun. 19, 2017 . Accepted: Aug. 31, 2017 . Published Online: Sep. 26, 2017.

Moon, et al., "Immunity to Signal Degradation by Overlayers Using a Novel Spatial-Phase-Matching Alignment System", J. Vac. Sci. Technol. B 13, 2648-2652 (1995).

Servin, et al., "Mask contribution on CD & OVL errors budgets for Double Patterning Lithography," 25th European Mask and Lithography Conference, 2009, pp. 1-13.

Wu, et al., (2012). Nanoimprint lithography with ≤60 nm overlay precision. Applied Physics A, 106, 767-772.

Zhou, et al., (2015). Moiré-Based Interferometry for Magnification Calibration of Bitelecentric Lens System. IEEE Photonics Journal. 7. 1-11. 10.1109/JPHOT.2015.2500892.

Zhou, et al., "Fourier-based analysis of moiré fringe patterns of superposed gratings in alignment of nanolithography", Optics Express, vol. 16, No. 11, p. 7869, 2008. doi: 10.1364/OE.16.007869.

Zhu et al. Four-quadrant gratings moiré fringe alignment measurement in proximity lithography. Optics Express. Feb. 2013;21(3):3463-3473. DOI: 10.1364/OE.21.003463. PMID: 23481804.

Zhu, et al., (2015). Adjustment Strategy for Inclination Moiré Fringes in Lithography by Spatial Frequency Decomposition. IEEE Photonics Technology Letters. 27. 395-398. 10.1109/LPT.2014.2370072.

European Patent Office, Extended European Search Report received in EP Application No. 23781547.7, Feb. 3, 2025, 13 pages.

Korean Intellectual Property Office, International Search Report and Written Opinion received in International Application No. PCT/US2025/022844, Jul. 22, 2025, 8 pages.

European Patent Office, Extended European Search Report received in EP Application No. 23781550.1, Jul. 10, 2025, 8 pages.

\* cited by examiner

SYSTEM AND METHOD FOR ISOLATION OF SPECIFIC FOURIER PUPIL FREQUENCY IN OVERLAY METROLOGY

TECHNICAL FIELD

The present invention generally relates to overlay metrology and, more particularly, to a system and method for overlay metrology with light modulation.

BACKGROUND

Overlay metrology generally refers to measurements of the relative alignment of layers on a sample such as, but not limited to, semiconductor devices. An overlay measurement, or a measurement of overlay error, typically refers to a measurement of the misalignment of fabricated features on two or more sample layers. In a general sense, proper alignment of fabricated features on multiple sample layers is necessary for proper functioning of the device.

Demands to decrease feature size and increase feature density are resulting in correspondingly increased demand for accurate and efficient overlay metrology. Metrology systems typically generate metrology data associated with a sample by measuring or otherwise inspecting dedicated metrology targets (i.e., overlay targets) distributed across the sample. Accordingly, the sample is typically mounted on a translation stage and translated such that the metrology targets are sequentially moved into a measurement field of view. In typical metrology systems employing a move and measure (MAM) approach, the sample is static during each measurement. However, the time required for the translation stage to settle prior to a measurement may negatively impact the throughput. Therefore, it is desirable to provide systems and methods for curing the above deficiencies.

SUMMARY

An overlay metrology system is disclosed in accordance with one or more illustrative embodiments of the present disclosure. In one illustrative embodiment, the system includes an illumination source configured to generate an illumination beam. In another illustrative embodiment, the system includes a collection sub-system having an objective lens configured to collect measurement light emanating from a sample in response to the illumination beam according to a metrology recipe, where the sample includes an overlay target comprising at least two layers according to the metrology recipe. In another illustrative embodiment, the system includes one or more detectors located at a first pupil plane. In another illustrative embodiment, the system includes a light modulator located at a second pupil plane, wherein the light modulator is configured to direct one or more selected portions of the measurement light in the second pupil plane to the one or more detectors. In another illustrative embodiment, the system includes a controller communicatively coupled to the collection sub-system, the controller including one or more processors configured to execute program instructions causing the one or more processors to execute the metrology recipe by: receiving detection signals from the one or more detectors, where the detection signals are associated with the one or more selected portions of the measurement light directed to the one or more detectors. In another illustrative embodiment, one or more processors are further configured to execute program instructions causing the one or more processors to execute the metrology recipe by: generating an overlay measurement associated with the at least two layers of the sample based on the detection signals, according to a metrology recipe.

An overlay metrology system with field plane detectors is disclosed in accordance with one or more illustrative embodiments of the present disclosure. In one illustrative embodiment, the system includes an illumination source configured to generate an illumination beam. In another illustrative embodiment, the system includes a collection sub-system having an objective lens configured to collect measurement light emanating from a sample in response to the illumination beam according to a metrology recipe, where the sample includes an overlay target comprising at least two layers according to the metrology recipe. In another illustrative embodiment, the system includes one or more detectors located at a collection field plane. In another illustrative embodiment, the system includes a light modulator located at a collection pupil plane, wherein the light modulator is configured to direct one or more selected portions of the measurement light in the collection pupil plane to the one or more detectors. In another illustrative embodiment, the system includes a controller communicatively coupled to the collection sub-system, the controller including one or more processors configured to execute program instructions causing the one or more processors to execute the metrology recipe by: receiving detection signals from the one or more detectors, where the detection signals are associated with the one or more selected portions of the measurement light directed to the one or more detectors. In another illustrative embodiment, the one or more processors are further configured to execute program instructions causing the one or more processors to execute the metrology recipe by: generating an overlay measurement associated with the at least two layers of the sample based on the detection signals, according to a metrology recipe.

A method for overlay metrology is disclosed in accordance with one or more illustrative embodiments of the present disclosure. In one illustrative embodiment, the method includes directing one or more selected portions of measurement light in a second pupil plane to one or more detectors located at a first pupil plane using a light modulator located in the second pupil plane, the one or more selected portions emanating from a sample. In another illustrative embodiment, the method includes receiving detection signals from the one or more detectors, wherein the detection signals are associated with the one or more selected portions of the measurement light. In another illustrative embodiment, the method includes generating an overlay measurement associated with two layers of the sample based on the detection signals.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures.

DETAILED DESCRIPTION

Figure 1A:
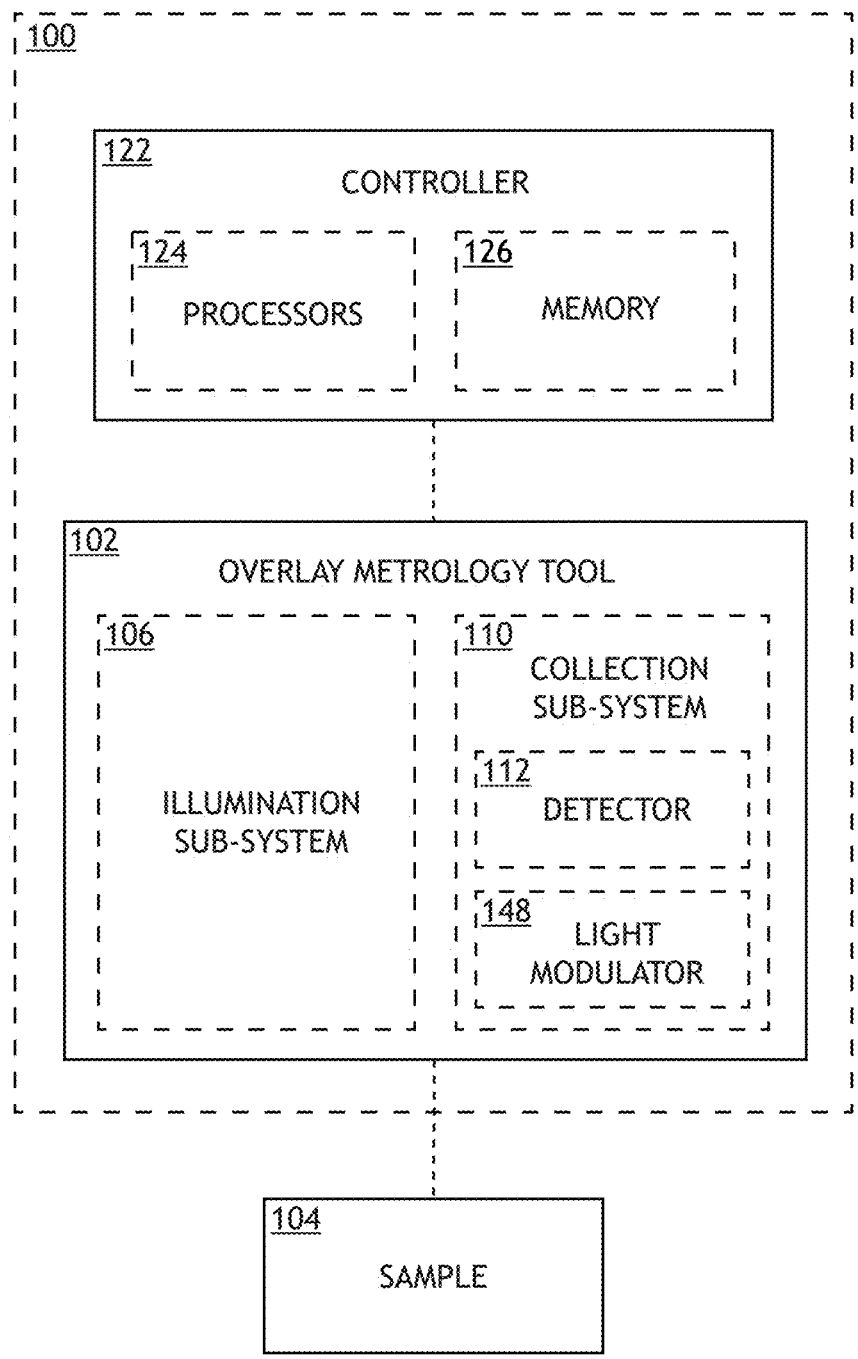
FIG. 1A is a conceptual view of a system for overlay metrology, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

Referring generally to FIGS. 1 through 5, systems and methods for overlay metrology with a light modulator in a collection pupil plane are disclosed, in accordance with one or more embodiments of the present disclosure.

Embodiments of the present disclosure are directed to using a light modulator in a collection pupil plane of an overlay metrology tool to filter and/or align portions of light collected from a sample during an overlay measurement (herein referred to as measurement light) on one or more detectors. In this way, the light modulator may provide active control of the portion of the measurement light incident on the detectors during a measurement.

It is contemplated herein that a light modulator in a collection pupil may be implemented using various overlay metrology target designs, measurement techniques, and corresponding overlay metrology tools.

In some embodiments, an image-based overlay metrology tool includes a light modulator in a collection pupil. For example, image-based overlay metrology tools may illuminate an overlay target (e.g., an advanced imaging metrology (AIM) target, a box-in-box metrology target, or the like) and capture an overlay signal including an image of the overlay target based on a variety of imaging techniques including, but not limited to, bright-field imaging or dark-field imaging. Accordingly, overlay may be determined by measuring the relative positions of the overlay target features in the captured image (e.g., a field plane distribution). It is contemplated herein that a light modulator located in the collection pupil of an image-based overlay metrology tool may enable tailored pupil-based filtering of measurement light that contributes to a generated image. For example, in the case of overlay targets having periodic features designed to generate discrete diffraction orders, a light modulator in the collection pupil may facilitate dynamic selection or blocking of diffraction orders that may contribute to a generated detection signal (e.g., image).

Additionally, collection pupil control using a light modulator may be implemented in either scanning or static measurement modes associated with imaging and/or scatterometry techniques. As an illustration, some scanning-based scatterometry measurement techniques include fast photodetectors in selected locations of a collection pupil to capture time-varying interference signals generated as the sample is in continuous motion and scanned with respect to an illumination beam. Various non-limiting scanning scatterometry overlay metrology techniques are described in U.S. Patent Publication No. 2022/0034652 filed on Feb. 17, 2021; U.S. patent application Ser. No. 17/119,536 filed on Dec. 11, 2020, U.S. patent application Ser. No. 17/708,958 filed on Mar. 30, 2022; and U.S. patent application Ser. No. 17/709,104 filed on Mar. 30, 2022; which are all incorporated herein by reference in their entireties. For example, fast photodetectors may be placed at locations of overlap between selected diffraction orders to capture time-varying interference signals in these regions. It is contemplated herein that a light modulator in a collection pupil of a scanning overlay metrology tool may enable tailored control of the measurement light incident on the fast photodetectors. In some embodiments, such a light modulator ensures proper alignment of the fast photodetectors by directing measurement light in selected portions of the collection pupil plane (e.g., locations including time-varying interference signals indicative of overlay) to the photodetectors. In this way, any errors in the physical placement of the photodetectors in a collection pupil plane may be corrected. In some embodiments, a light modulator in a collection pupil plane filters the measurement light incident on the photodetectors. For instance, the signal to noise ratio (SNR) of the time-varying signals may be improved by filtering out portions of the measurement light that do not include the time-varying signals.

FIG. 1A is a conceptual view of a system 100 for overlay metrology, in accordance with one or more embodiments of the present disclosure.

In one embodiment, the system 100 includes an overlay metrology tool 102 to perform overlay measurements on sample 104.

In embodiments, as shown in FIG. 1A, overlay metrology tool 102 includes an illumination sub-system 106 and a collection sub-system 110, which may include one or more detectors 112 and a light modulator 148 (e.g., in a collection pupil plane 114).

In one embodiment, as mentioned, the overlay metrology system 100 (or overlay metrology tool 102) includes an illumination sub-system 106 configured to generate illumination in the form of one or more illumination beams 108 to illuminate the sample 104 and a collection sub-system 110 to collect light from the illuminated sample 104 (e.g., according to a metrology recipe). Further, the one or more illumination beams 108 may be spatially limited such that they may illuminate selected portions of the sample 104. For instance, each of the one or more illumination beams 108 may be spatially limited to illuminate a particular cell 204 of an overlay target 202.

It should be noted that any description/limitation of a sample 104 (e.g., features/layers/targets of a sample) in this disclosure may be construed as a description/limitation according to a "metrology recipe". For example, system 100 may be configured for certain types of samples or features of a sample, according to a metrology recipe. For instance, the system 100 may be designed (configured to) and/or programmed (e.g., program instructions) to calculate overlay measurements of certain types of features of a sample (e.g., grating-over-grating target), which is what "according to a metrology recipe" or the like may mean.

Referring again to FIGS. 1A-1C, the one or more detectors 112 and the light modulator 148 of the overlay metrology tool 102 are described in greater detail in accordance with one or more embodiments of the present disclosure.

As mentioned, in embodiments, the system 100 may further include a light modulator 148. The light modulator 148 may generally be configured to selectively direct (e.g., transmit, reflect, aim, align, filter, and the like) one or more selected portions of light (e.g., measurement light) in a collection pupil plane 114 to one or more detectors 112. In this way, the light modulator 148 may allow for selecting/directing specific/selected portions of the distribution of measurement light in the collection pupil plane to be incident on a detector 112 (or one or more detectors 112).

Figure 1B:
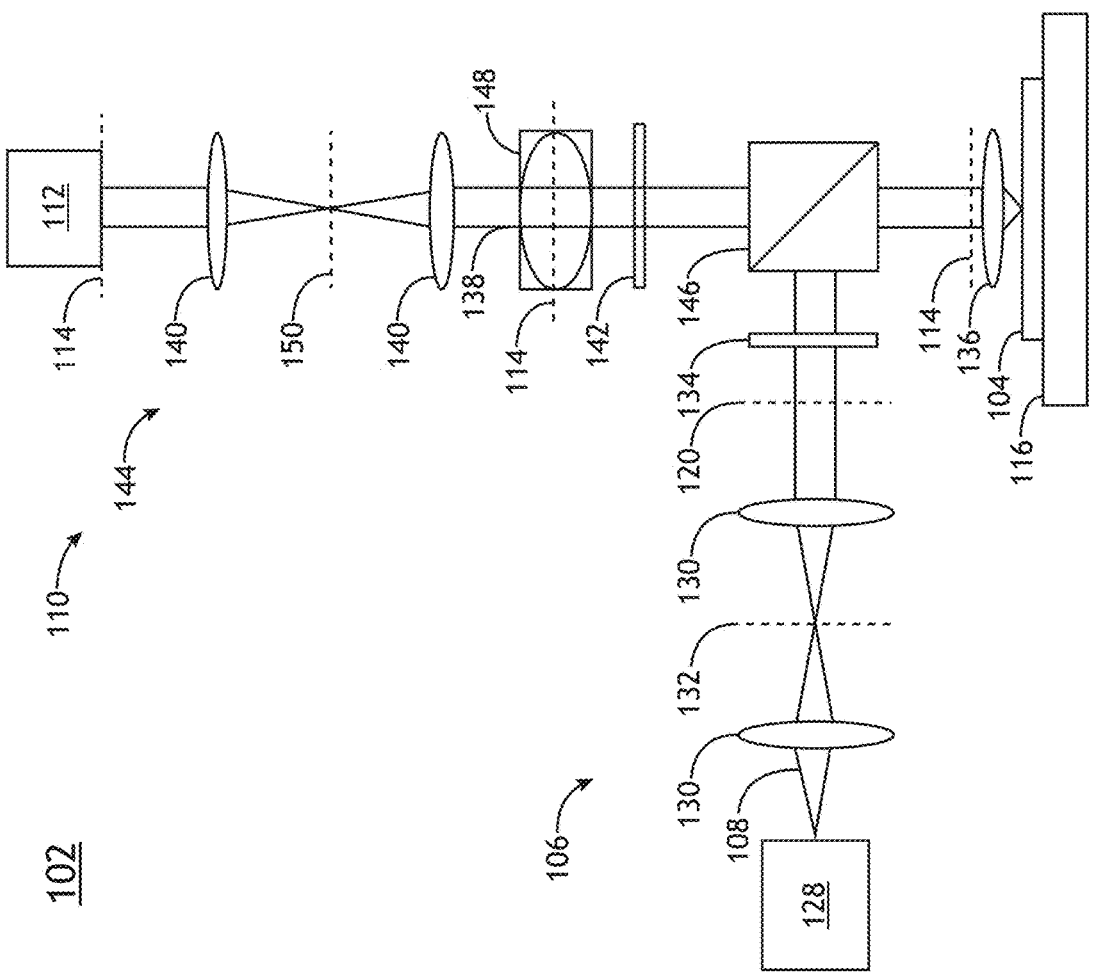
FIG. 1B is a schematic view of the overlay metrology tool with a transmissive light modulator in a collection pupil plane, in accordance with one or more embodiments of the present disclosure.

FIG. 1B is a schematic view of the overlay metrology tool 102 with a transmissive light modulator 148 in a collection pupil plane 114, in accordance with one or more embodiments of the present disclosure. For example, the light modulator 148 of FIG. 1A may be a transmissive light modulator 148 (as shown in FIG. 1B). In one embodiment, the transmissive light modulator 148 is a deformable optic.

Figure 1C:
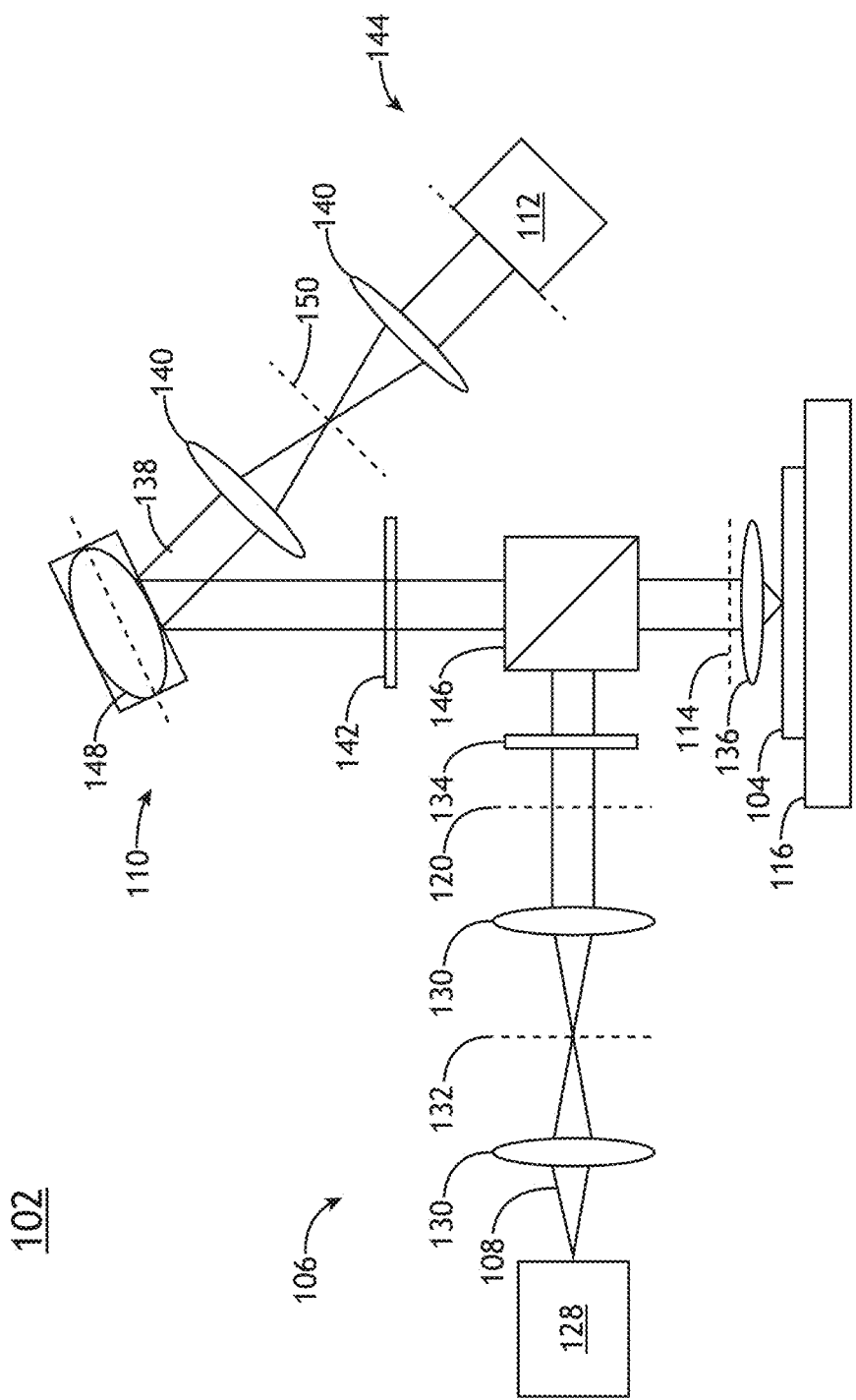
FIG. 1C is a schematic view of the overlay metrology tool with a reflective light modulator in a collection pupil plane, in accordance with one or more embodiments of the present disclosure.

FIG. 1C is a schematic view of the overlay metrology tool 102 with a reflective light modulator 148 in a collection pupil plane 114, in accordance with one or more embodiments of the present disclosure. For example, the light modulator 148 of FIG. 1A may be a transmissive light modulator 148 configured to selectively transmit one or more selected portions of light (e.g., measurement light) of a collection pupil plane 114 to one or more detectors 112. In this regard, the light modulator 148 may be a reflective light modulator 148 configured to selectively reflect one or more selected portions of light (e.g., measurement light) of a collection pupil plane 114 to the one or more detectors 112. In one embodiment, the reflective light modulator 148 is a micro-electro-mechanical system (MEMS) device. In another embodiment, the reflective light modulator 148 is a digital light processing device (DLP). For example, the DLP may comprise a digital micromirror device (DMD) that may be a MEMS device. In another embodiment, the light modulator includes at least one of a spatial light modulator, a micro-electro-mechanical system (MEMS) device, or a deformable optic.

Referring again to light modulators generally, in other embodiments, the light modulator 148 is dynamically adjustable. For example, the light modulator 148 may be configured to be dynamically adjustable to provide dynamic selection of the selected portion of the measurement light directed to the one or more detectors. For instance, overlay metrology tool 102 may be configured to adjust (e.g., dynamically select) the one or more selected portions of the measurement light directed to the one or more detectors before (e.g., prior to) a sample 104 entering a measurement field of view and/or before a measurement is taken (e.g., before receiving detection signals).

Referring now to detectors 112 generally, as mentioned, in some embodiments, the system 100 may include one or more detectors 112. Depending on the embodiment, unless noted otherwise, the one or more detectors 112 may be used for scanning overlay metrology, static overlay metrology, or both and with imaging and/or scatterometry techniques. For example, the one or more detectors 112 may be located in a collection pupil plane for scanning overlay metrology. In another example, the one or more detectors 112 may be located in a collection field plane for static overlay metrology. In embodiments for scanning overlay metrology, the detectors 112 may generally include any type of optical detector known in the art suitable for capturing interference signals generated as the sample 104 is translated by the translation stage 116 and/or as one or more illumination beams 108 are scanned by a beam-scanning sub-system.

In embodiments for scanning overlay metrology, as an example, the one or more detectors 112 are located in a collection pupil plane 114 (e.g., first pupil plane) as shown in FIGS. 1B and 1C.

For instance, for scanning overlay metrology, the one or more detectors 112 may include at least one of a photodiode, an avalanche photodiode, or a photomultiplier tube. For example, the one or more detectors 112 may include, but are not limited to, fast photodiodes. In another example, the one or more detectors 112 includes a (or multiple) photodiode. In another example, the one or more detectors 112 includes an (or multiple) avalanche photodiode. In another example, the one or more detectors 112 includes a (or multiple) photomultiplier tube.

In other embodiments in the context of scanning overlay metrology, the overlay metrology tool 102 may include a translation stage 116 to scan the sample 104 through a measurement field of view of the overlay metrology tool 102 during a measurement.

For example, scanning overlay metrology may mean receiving detection signals from one or more detectors 112 while the sample 104 is motion relative to the one or more detectors 112 such that the detection signals are time-varying interference signals.

Referring now to overlay metrology generally (not specifically scanning overlay metrology), in another embodiment, sensor elements of the one or more detectors underfill the first pupil plane, and the light modulator 148 directs the selected portion of the measurement light to locations of the sensor elements. Underfill may mean that the entire portion/area of the distribution of light in the first pupil plane is not entirely filled by the sensor elements of the one or more detectors such that some portions of the distribution are not detected.

In another embodiment, sensor elements of the one or more detectors are not aligned to desired portions of the pupil plane. For example, due to a variety of reasons (e.g., but not limited to, a change in wavelength, different overlay target characteristics, and other reasons causing a change in the desired pupil area to detect) a desired pupil portion/area for detection may change and not necessarily align with the area to be detected (e.g., detected portion 310a and detected portion 310b of FIG. 3B). In this instance, the light modulator 148 may be configured to (controlled to) dynamically adjust to select for the areas to be detected. For example, the light modulator 148 may "direct" (transmit, reflect, align, aim, selectively block, filter, and the like) light such that the desired areas of the pupil plane that are directed to the one or more detectors are the same as the selected portions 308 within the detected portions 310 shown in FIG. 3B (or at least some of the desired/selected areas 308 are within the detected portions 310).

In another embodiment, in a scanning overlay metrology mode, the one or more detectors generate the detection signals as the sample is static. For example, the sample may be static during generation/receiving of detection signals according to the metrology recipe. For example, as opposed to an "on the fly" scanning method/system where the sample may be continuously translated during generation of detection signals of overlay targets.

For static overlay metrology, in one embodiment, the light modulator 148 is in a collection pupil plane 114 and the one or more detectors 112 are in a collection field plane 150. In this regard, the one or more detectors 112 may be able to image the entire field plane, which is, in a general sense, conjugate to the object plane such that the sample 104 may be imaged from a top down view (not shown).

For static overlay metrology, in some embodiments, the one or more detectors include a multi-pixel sensor. For example, the multi-pixel sensor may be at least one of a charge-coupled device (CCD) or a complementary metal-oxide-semiconductor (CMOS) device. For instance, the multi-pixel sensor may be a charge-coupled device (CCD) in one embodiment and a complementary metal-oxide-semiconductor (CMOS) device in another embodiment.

Referring now to scatterometry overlay metrology, various elements are described.

In some embodiments, generally, the overlay metrology tool 102 may perform scatterometry overlay measurements on portions of the sample 104 having overlay targets such as, but not limited to, grating-over-grating structures (according to a metrology recipe).

It is recognized herein that the distribution of diffracted orders of an illumination beam 108 by a periodic structure (such as a grating-over-grating structure) may be influenced by a variety of parameters such as, but not limited to, a wavelength of the illumination beam 108, an incidence angle of the illumination beam 108 in both altitude and azimuth directions, a period of the periodic structures (i.e., pitch), or a numerical aperture (NA) of a collection lens. Accordingly, in embodiments of the present disclosure, the illumination sub-system 106, the collection sub-system 110, and the overlay target 202 may be configured to provide an overlapping distribution of zero-order diffraction and first-order diffraction in the collection pupil plane 114 of the collection sub-system 110. For example, the illumination sub-system 106 and/or the collection sub-system 110 may be configured to generate measurements on grating-over-grating structures having a selected range of periodicities that provide the overlapping distribution. Further, various components of the illumination sub-system 106 and/or the collection sub-system 110 (e.g., stops, pupils, or the like) may be adjustable to provide the overlapping distribution for a given structure (e.g., grating-over-grating) with a given periodicity.

The collection sub-system 110 may collect at least one of 0-order diffraction (e.g., specular reflection) and +/−1 diffraction orders from the sample 104 associated with diffraction of the illumination beam 108. Further, the collection sub-system 110 may include one or more detectors 112 positioned in a collection pupil plane 114 (e.g., at locations of overlap between the 0-order diffraction and the +/−1 diffraction orders). For example, the areas 332 of FIG. 3E (described in more detail later in this disclosure) may be locations of overlap between the 0-order diffraction and the +/−1 diffraction orders (e.g., and possibly also overlap of 0-order diffraction and the +/−2 diffraction orders) such that information of the absolute grating position (e.g., indicative of overlay measurement) may, in some embodiments, be determined/generated (e.g., by controller 122).

In another embodiment, the overlay metrology tool 102 includes an objective lens 136 to focus the illumination beam 108 onto the sample 104 (e.g., an overlay target 202 with overlay target elements located on two or more layers of the sample 104). For example, the objective lens 136 may be configured to collect measurement light emanating from a sample 104 in response to the illumination beam 108 according to a metrology recipe. For instance, the sample 104 may include an overlay target 202 formed from one or more cells 204, each cell 204 including a grating-over-grating structure formed from grating structures on two layers of the sample according to the metrology recipe (as shown in FIG. 2).

Figure 2:
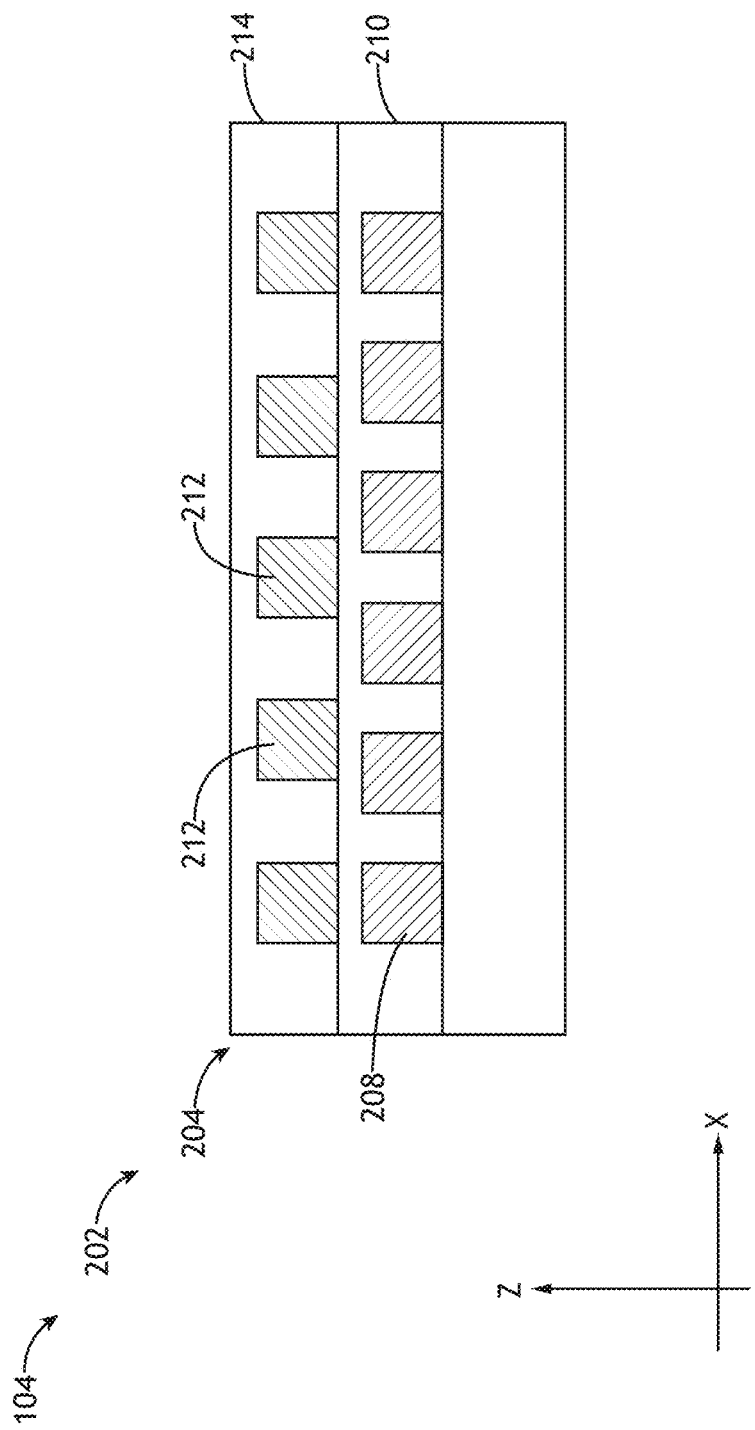
FIG. 2 is a side view of a single cell of an overlay target of a sample, in accordance with one or more embodiments of the present disclosure.
Figure 3B:
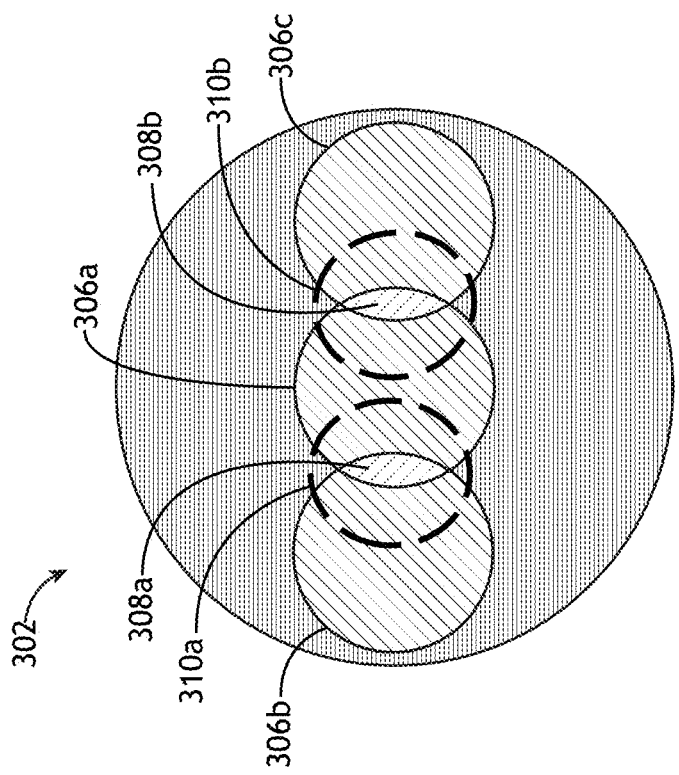
FIG. 3B illustrates a schematic of a collection pupil plane distribution of diffraction orders of the circular illumination beam of FIG. 3A, in accordance with one or more embodiments of the present disclosure.
Figure 3A:
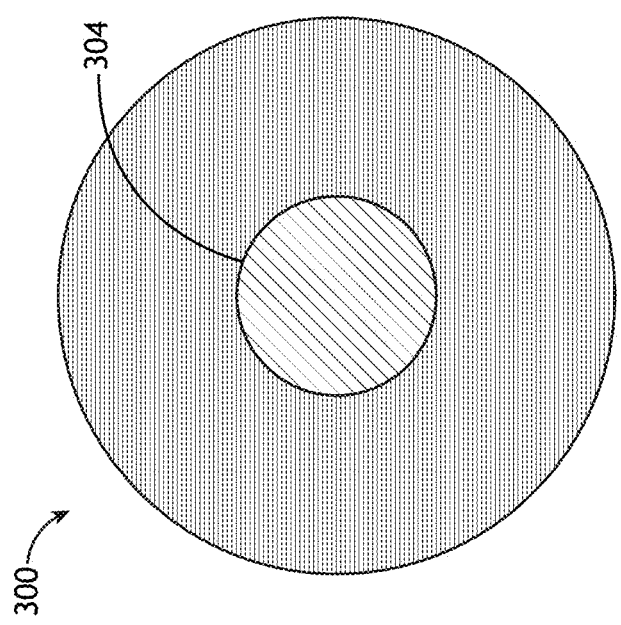
FIG. 3A illustrates a schematic of an illumination pupil plane distribution of a circular illumination beam, in accordance with one or more embodiments of the present disclosure.
Figure 3D:
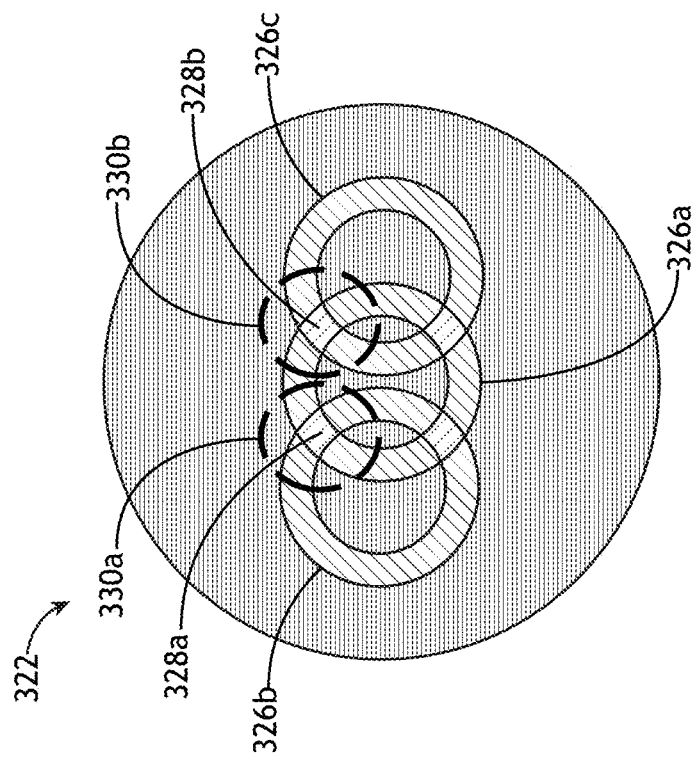
FIG. 3D illustrates a schematic of a collection pupil plane distribution of diffraction orders of the annular illumination beam of FIG. 3C, in accordance with one or more embodiments of the present disclosure.
Figure 3C:
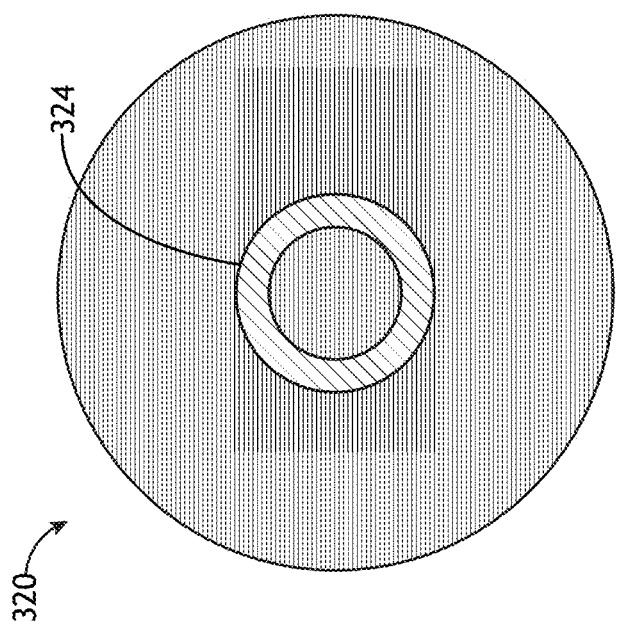
FIG. 3C illustrates a schematic of an illumination pupil plane distribution of an annular illumination beam, in accordance with one or more embodiments of the present disclosure.
Figure 3E:
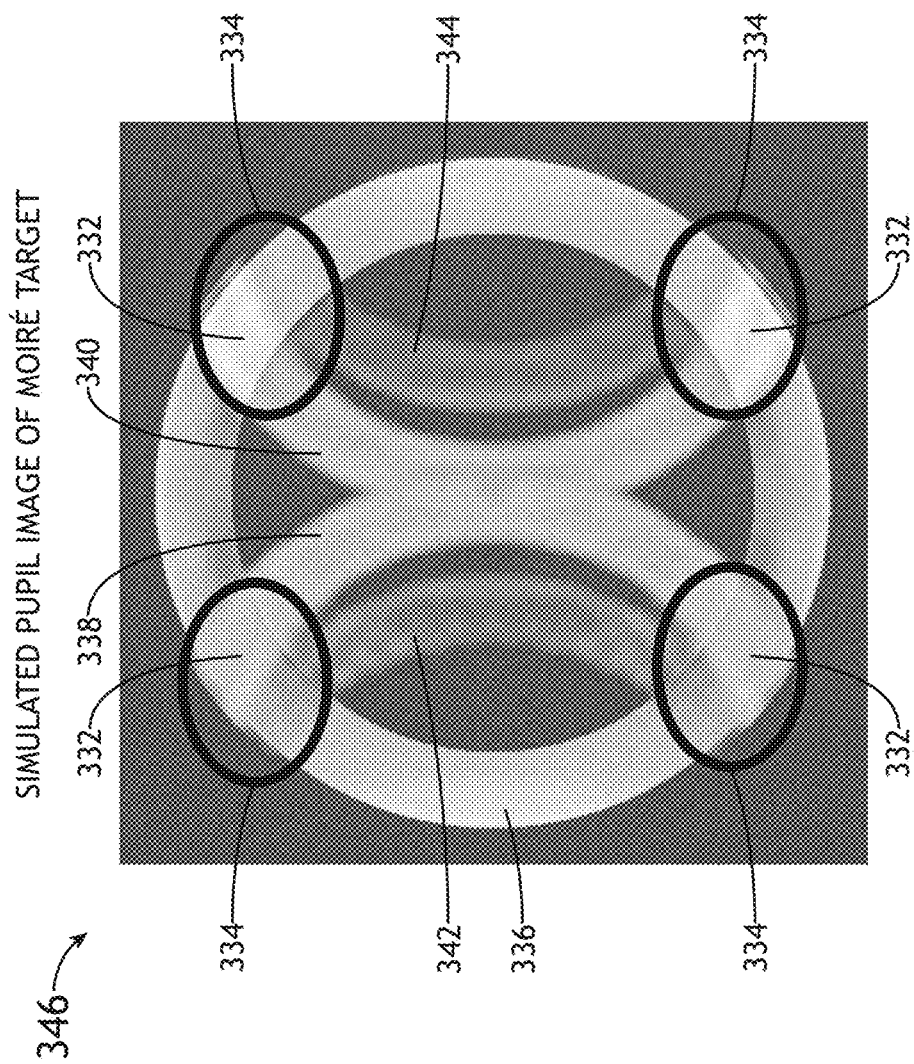
FIG. 3E illustrates a simulated collection pupil distribution of a moiré target of a sample, in accordance with one or more embodiments of the present disclosure.
Figure 4:
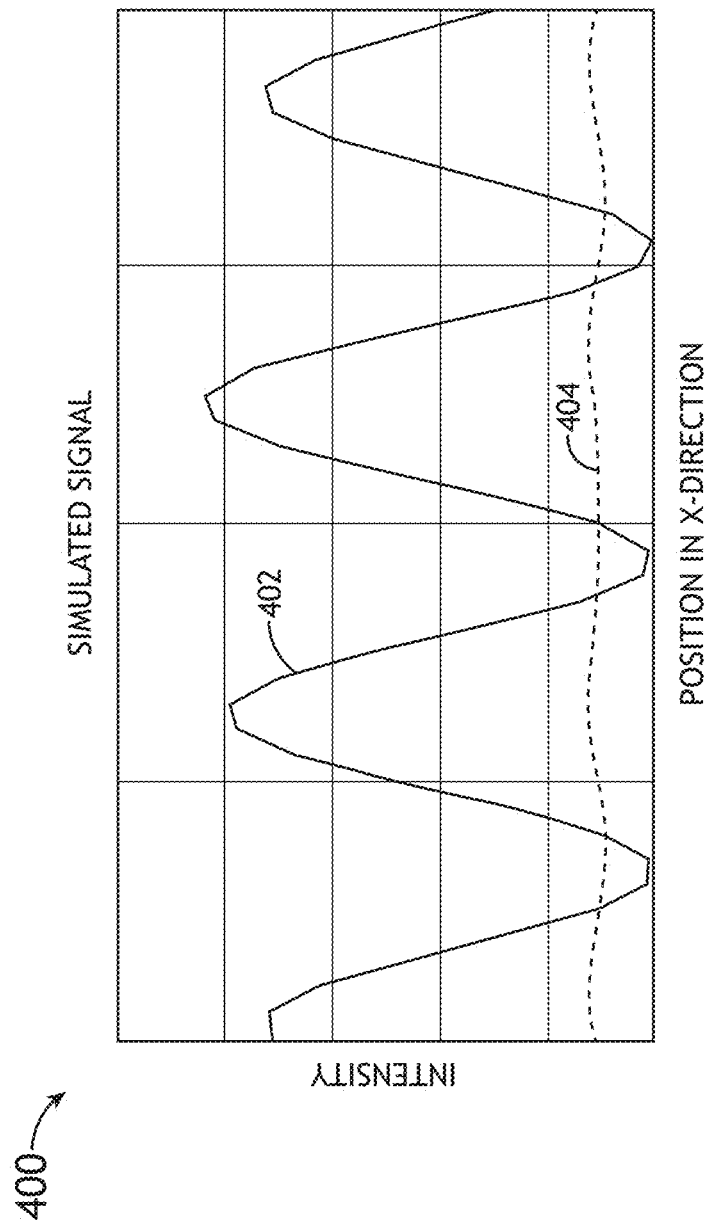
FIG. 4 illustrates a graphical representation of simulated intensity signals of various regions of FIG. 3 measured over an X-direction of the sample, in accordance with one or more embodiments of the present disclosure.

Referring now to FIGS. 2 through 4, regarding various non-limiting embodiments of scanning scatterometry overlay metrology, detection signals from overlay targets 202 of a sample 104 using a light modulator 148 in a collection pupil plane 114 are described in greater detail in accordance with one or more embodiments of the present disclosure. It should be noted that FIGS. 2 through 4 and accompanying descriptions in the context of scanning scatterometry overlay metrology are non-limiting examples and descriptions and scanning scatterometry overlay metrology may be implemented with this disclosure in a number and variety of ways.

FIG. 2 is a side view of a single cell 204 of an overlay target 202 of a sample 104, in accordance with one or more embodiments of the present disclosure in the context of scatterometry overlay metrology.

In some embodiments, a scatterometry-based overlay metrology tool includes a light modulator in a collection pupil. In one example, scatterometry-based overlay metrology tools may illuminate an overlay target (e.g., a grating-over-grating metrology target, or the like) and capture an overlay signal including an angular distribution of light emanating from the overlay target associated with diffraction, scattering, and/or reflection of the illumination beam. In this case, overlay may be determined based on the angular distribution of the captured/measured light (e.g., a pupil plane distribution).

In one embodiment, the grating structures on the two layers (e.g., first layer 210 and second layer 214) of the sample 104 in the overlay target 202 have a common pitch (e.g., periodic distance between elements 212).

In another embodiment, the grating structures on the two layers of the sample 104 in the overlay target have different pitches, wherein the grating-over-grating structures form Moiré structures (as shown in FIG. 2).

In one embodiment, the cell 204 includes first-layer printed elements 208 located on a first layer 210 of the sample 104 and second-layer printed elements 212 located on a second layer 214 of the sample 104 oriented such that the regions including the first-layer printed elements 208 and the second-layer printed elements 212 overlap to form a grating-over-grating structure. Further, as illustrated in FIG. 2, the first-layer printed elements 208 may be, but are not required to be, designed to include an intended offset (due to different pitches) from the second-layer printed elements 212 along the measurement direction (e.g., the X direction in FIG. 2) by a selected amount, which may facilitate the measurement of overlay error associated with a deviation from the intended offset along the measurement direction. As will be described in greater detail below, it is to be understood that an overlay target 202 may generally be formed from any number of cells 204 and that any particular cell 204 may include a grating-over-grating feature with a periodicity along any direction.

For example, many scatterometry overlay metrology techniques generally determine overlay by illuminating an overlay target having grating structures in two layers (e.g., grating-over-grating structures), where an overlay measurement is based on asymmetries between positive (e.g., +1) and negative (e.g., −1) diffraction orders. For example, various scatterometry techniques are described in U.S. patent application Ser. No. 17/068,328 filed on Oct. 12, 2020; U.S. Pat. No. 10,824,079 issued on Nov. 3, 2020; U.S. Pat. No. 10,197,389 issued on Feb. 9, 2019; and Adel, et al., "Diffraction order control in overlay metrology: a review of the roadmap options," Proc. SPIE. 6922, Metrology, Inspection, and Process Control for Microlithography XXII, 692202. (2008); all of which are incorporated herein by reference in their entireties. It is contemplated herein that a light modulator located in a collection pupil of a scatterometry overlay metrology tool may enable control and/or filtering of the diffraction orders directed to one or more detectors during a measurement.

It is to be understood, however, that the overlay target 202 in FIG. 2 (and elements in related FIGS. 3A-4) and the associated descriptions are provided solely for illustrative purposes and should not be interpreted as limiting. Rather, the overlay target 202 may include any suitable design (e.g., grating-over-grating overlay target design, grating next to grating, three-layer grating). For example, the overlay target 202 may include any number of cells 204 suitable for measurements along two directions. Further, the cells 204 may be distributed in any pattern or arrangement. For example, metrology target designs suitable for scanning metrology are generally described in U.S. Pat. No. 11,073,768 issued on Jul. 27, 2021, which is incorporated herein by reference in its entirety. In one embodiment, the overlay target 202 includes one or more cell groupings distributed along a scanning direction (e.g., a direction of motion of the sample 104), where cells 204 within each particular cell grouping are oriented to have grating-over-grating structures periodic along a common direction. For instance, a first cell grouping may include one or more cells 204 having periodicities along the X direction and a second cell grouping may include one or more cells 204 having periodicities along the Y direction. In this way, all cells 204 within a particular cell grouping may be imaged/detected at the same time while the sample 104 is scanned through a measurement field of view of the collection sub-system 110. By way of another example, diagonal targets suitable for metrology measurements in orthogonal directions in a single scan are described generally in U.S. Patent Publication No. 2021/0364935 published on Nov. 25, 2021, which is incorporated herein by reference in its entirety. Further, the illumination beam may be any number of configurations/shapes, not limited to those shown in FIGS. 3A and 3C, and the detectors 112 are not limited to the positions, sizes, etc. of areas shown (e.g., first detected area 330a and second detected area 330b). In some embodiments, the sizes and shapes of diffraction orders in the collection pupil plane 114 may generally be related to the size and shape of the illumination beam 108 on the sample 104. For example, although not shown, in the case that the illumination beam 108 is elongated the diffraction orders may similarly be elongated (e.g., in orthogonal directions).

Referring now to FIGS. 3A-3E, various examples of illumination pupil plane distributions (shown in FIGS. 3A and 3C) and corresponding collection pupil plane distributions (shown in FIGS. 3B and 3D) of diffraction orders of the illumination beam distributions are illustrated in accordance with one or more embodiments of the present disclosure. In particular, examples of selected portions of measurement light (e.g., selected portion 308a of FIG. 3B; directed/directable by a light modulator 148) and detected portions of measurement light (e.g., detected portion 310a; detected/detectable by a detector 112) and diffraction orders (e.g., first order (−1) circular diffraction order 306b; emanating from an overlay target) are illustrated by FIGS. 3A-3E, in accordance with one or more embodiments of the present disclosure. FIGS. 3A-3B are in relation to diffraction orders corresponding to a circular illumination beam 304 and FIGS. 3C-3E are in relation to diffraction orders corresponding to an annular illumination beam 324.

In embodiments, as mentioned, the light modulator 148 may be configured to direct (e.g., transmit, reflect, align, aim, selectively block, and the like) one or more selected portions (areas) of light to one or more detected portions (areas) to be detected by the one or more detectors 112. In this regard, a selected portion may be a portion (e.g., of measurement light) selected for detection by aiming (using a light modulator) the selected portion to a portion (area) that will be detected (e.g., to a detected portion corresponding to what will be detected by a detector 112). Alternately, or in addition, (e.g., and described in reference to a single selected portion for clarity purposes, but not limited to the singular) the selected portion may be a filtered/non-filtered portion such that only the selected portion is detected by a detector 112 (e.g., and immediate portions surrounding the selected portion are not detected by the detector (e.g., filtered out by the light modulator 148)). For example, although not shown, in some embodiments, the simulated distribution of light at a collection pupil plane 114 of a detector 112 (rather than the pupil plane of the light modulator, as FIG. 3B was originally intended to illustrate) may be illustrated by changing FIG. 3B such that the distribution 302 is completely (or nearly completely) absent of light in every portion/area except for the selected (overlapping) portions 308 (e.g., first selected portion 308a and second selected portion 308b of FIG. 3B). Further, in regards to such an example, the detected portions 310 are the portions/areas to be detected by each detector 112 (e.g., detected as detection signals (e.g., time-varying interference signals)). Note that, in some embodiments of the above example, the detected portions 310 are larger than the selected portions 308 (as shown in FIG. 3B) such that less than the maximum theoretical detected portion/area of measurement light detectable by a detector 112 is actually detected (e.g., allowing for irrelevant and/or undesired portions to be filtered out and for ensuring desired portions are detected (with a margin of error), thereby increasing signal to noise ratio). However, it should be noted that any configuration may be used. For example, any configuration of selected portions that are bigger, smaller and/or equal, and completely overlapping and/or partially overlapping with the detected portions may be used.

Generally, as examples, but not limited to these examples, the one or more selected portions may be: first selected portion 308a, second selected portion 308b of FIG. 3B; first selected portion 328a, second selected portion 328b of FIG. 3D; and/or selected portions 332 of FIG. 3E.

Further, the one or more detected portions may be, but are not limited to: first detected portion 310a, second detected portion 310b of FIG. 3B; first detected portion 330a, second detected portion 330b of FIG. 3D; and/or detected portions 334 of FIG. 3E. For example, the one or more detectors 112 may be a first photodiode 112 configured to detect the average intensity of light in detected area 330a and a second photodiode 112 configured to detect the average intensity of light in detected area 330b. Further, controller 122 may be configured to generate an overlay measurement associated with the two layers of the sample 104 based on the detection signals (of the first photodiode 112 and second photodiode 112).

In one embodiment, the illumination sub-system 106 illuminates the overlay target 202 with one or more illumination beams 108 at normal incidence (or near-normal incidence). Further, the one or more illumination beams 108 may illuminate the overlay target 202 with a limited range of incidence angles as illustrated by the limited size of the distribution 302 of the collection pupil plane 114 in FIG. 3B. In this regard, the overlay target 202 may diffract the one or more illumination beams 108 into discrete diffraction orders 306 (306a,306b,306c).

FIG. 3A illustrates a schematic of an illumination pupil plane distribution 300 of a circular illumination beam 304, in accordance with one or more embodiments of the present disclosure. In one embodiment, the illumination beam 108 of system 100 is circular (as shown by circular illumination beam 304).

FIG. 3B illustrates a schematic of a collection pupil plane distribution 302 of diffraction orders of the circular illumination beam 304 of FIG. 3A, in accordance with one or more embodiments of the present disclosure. For example, a circular illumination beam 304 may form circular diffraction orders in a collection pupil plane 114 as shown in FIG. 3B by zero order (0) circular diffraction order 306a, first order (+1) circular diffraction order 306c, and first order (−1) circular diffraction order 306b when an overlay target 202 is illuminated by the circular illumination beam 304.

FIG. 3C illustrates a schematic of an illumination pupil plane distribution 320 of an annular illumination beam 324, in accordance with one or more embodiments of the present disclosure. In one embodiment, the illumination beam 108 of system 100 is annular (e.g., ring shaped), as shown by annular illumination beam 324.

FIG. 3D illustrates a schematic of a collection pupil plane distribution of diffraction orders of the annular illumination beam of FIG. 3C, in accordance with one or more embodiments of the present disclosure. For example, an annular illumination beam 324 may form annular diffraction orders in a collection pupil plane 114 as shown in FIG. 3D by zero order (0) annular diffraction order 326a, first order (+1) annular diffraction order 326c, and first order (−1) annular diffraction order 326b when an overlay target 202 is illuminated by the annular illumination beam 324.

In another example, the selected portions of the measurement light 138 directed to the one or more detectors 112 may include regions of overlap of annular diffraction orders from the Moiré structures (e.g., overlapping rings in FIGS. 3D and 3E).

FIG. 3E illustrates a simulated pupil distribution 346 of a moiré target of a sample, in accordance with one or more embodiments of the present disclosure. For example, the simulated pupil distribution 346 may be a simulated distribution of the moiré overlay target 202 shown in FIG. 2 and may be theoretically capturable in a collection pupil plane 114. Further, the simulated pupil distribution 346 may be a simulated pupil distribution of the collection pupil plane distribution 322 shown in FIG. 3D of diffraction orders of the annular illumination beam 324.

For example, FIG. 3E may be a top view of a collection pupil in a collection pupil plane 114 (e.g., any collection pupil plane 114) of the overlay metrology tool 102 in accordance with one or more embodiments of the present disclosure. In this regard, the collection pupil plane 114 may correspond to a collection pupil plane 114 in the collection sub-system 110 as illustrated in FIG. 1B or FIG. 1C.

In embodiments, each ring or partial ring shown in FIG. 3E may be a diffraction order of a diffraction of a grating element (e.g., element 212) of FIG. 2.

For example, simulated pupil distribution 346 may include zero order (0) annular diffraction order 336, first order (+1) second (top) layer annular diffraction order 340, first order (−1) second layer annular diffraction order 338, first order (+1) first (lower) layer annular diffraction order 344, and first order (−1) first layer annular diffraction order 342. For instance, first order (+1) second (top) layer annular diffraction order 340 may be a first order diffraction from element 212 of the second layer (top layer) 214 of FIG. 2. Further, first order (+1) first layer annular diffraction order 344 may be a first order diffraction from element 208 of the first layer (lower layer) 210 of FIG. 2. In this regard, detected areas 334 may detect an overlapping of diffraction orders of multiple layers (e.g., first layer 210 and second layer 214) of an overlay target 202; for example, to generate an overlay measurement (misregistration) of the layers.

For example, according to a metrology recipe, the first-order diffractions (e.g., first order (+1) second (top) layer annular diffraction order 340, first order (−1) second layer annular diffraction order 338, first order (+1) first (lower) layer annular diffraction order 344, and first order (−1) first layer annular diffraction order 342) may partially overlap the zero order diffraction order 336, as shown in FIG. 3E. For example, as illustrated in FIG. 3E, the first order (+1) second layer annular diffraction order 340 and the first order (+1) first layer annular diffraction order 344 overlap each other (shown by the two left selected portions 334). Similarly, first order (−1) diffractions overlap the zero order (0) annular diffraction order 336 (shown by the two right selected portions 334).

FIG. 4 illustrates a graphical representation 400 of simulated intensity signals of various regions of FIG. 3E measured over an X-direction of the sample 104, in accordance with one or more embodiments of the present disclosure.

For example, FIG. 4 may be a chart of simulated detection signals received by one or more detectors 112 at a collection pupil plane 114 (e.g., of a moiré overlay target 202 comprising layers with gratings of different pitches), measured over an X-direction (e.g., X-direction of FIG. 2) of the sample 104. In another instance, the detection signal may be received as the sample is in motion (e.g., in a fast-scanning system) such that the detection signals are time-varying signals (e.g., interference signals).

In some embodiments, the first signal 402 may be a simulated signal of the average intensity (e.g., light intensity) of at least one detected portion 334 of the four detected portions (areas) 334 shown in FIG. 3E measured over the X-direction. Further, the second signal 404 may be an average intensity of the entire simulated distribution 346 of FIG. 3E measured over the X-direction.

It should be noted that the selected portions 332 may be selected or configured to be selected such that the signal to noise ratio (SNR) of the signal is improved/higher as shown by the first signal 402 compared to the second signal 404. Note that, in the example of FIG. 4, the first signal 402 associated with the detected portions 334 (and selected portions 332) has a larger intensity of oscillation with a higher SNR than the second signal 404 associated with an average intensity of the entire collection pupil area.

In some embodiments, and as evidenced by FIG. 4, it is contemplated that selecting for one or more selected portions of the pupil plane is required for generation of meaningful information.

For instance, selecting for one or more selected portions of the pupil plane allows for separating signal contributors according to their location and thus simplifying the math for overlay measurement determination/generation.

The following formulas relate to an overlay target with two or more layers, such as shown in FIG. 2, with a first (top) layer with a first pitch (p1) and a second (lower) layer with a second pitch (p2). For example, the following formulas may be used for diffraction-based overlay (DBO) measurements. In another example, the following formulas may be used for robust advanced imaging metrology (rAIM) targets.

The intensity measured in the overlap between zero and first-order diffraction (e.g., corresponding to a time-varying signal) from grating with pitch 1 is:

$$I_{p1\pm} =$$
$$(E0 + E1)^2 = (E0)^2 + (E1)^2 + 2E0E1 = DC + 2A_1 A_0 \cos\left[\frac{2\pi}{P_1}(X - X_0) \pm \varphi\right]$$

The intensity measured in the overlap between zero and first-order diffraction (e.g., corresponding to a time-varying signal) from grating with pitch 2 is:

$$I_{p2\pm} = (E0 + E1)^2 =$$
$$(E0)^2 + (E1)^2 + 2E0E1 = DC + 2A_1' A_0' \cos\left[\frac{2\pi}{P_2}(X - X_0 + OVL) \pm \theta\right]$$

The center of symmetry of p1 may be characterized as:

$$COC_{p1\pm} = X_0 \pm \frac{\varphi \cdot P_1}{2\pi}$$

The center of symmetry of p2 may be characterized as:

$$COC_{p2\pm} = X_0 + OVL \pm \frac{\varphi \cdot P_2}{2\pi}$$

The overlay measurement for plus and minus (separately to remove $X_0$ dependency):

$$OVL(+) = COC_{p2+} - COC_{p1+} =$$
$$X_0 + OVL + \frac{\varphi \cdot P_1}{2\pi} - X_0 - \frac{\theta \cdot P_2}{2\pi} = OVL + \frac{\varphi \cdot P_1}{2\pi} - \frac{\theta \cdot P_2}{2\pi}$$

$$OVL(-) = COC_{p2-} - COC_{p1-} =$$
$$X_0 + OVL - \frac{\varphi \cdot P_1}{2\pi} - X_0 + \frac{\theta \cdot P_2}{2\pi} = OVL - \frac{\varphi \cdot P_1}{2\pi} + \frac{\theta \cdot P_2}{2\pi}$$

The final (overall) overlay measurement:

$$\text{Final } OVL = \frac{(OVL(+) + OVL(-))}{2} =$$
$$\frac{\left(OVL + \frac{\varphi \cdot P_1}{2\pi} - \frac{\theta \cdot P_2}{2\pi} + OVL - \frac{\varphi \cdot P_1}{2\pi} + \frac{\theta \cdot P_2}{2\pi}\right)}{2} = \frac{2(OVL)}{2} = OVL$$

where $P_1$ is pitch of elements in the first layer; $P_2$ is pitch of elements in the second layer; $A_0$, $A_1$, correspond to strengths of the zero and first diffraction orders, respectively, associated with pitch $P_1$; $A_0'$, $A_1'$ correspond to strengths of the zero and second diffraction orders, respectively, associated with pitch $P_2$; $\varphi$ is a phase term associated with the $I_{p1\pm}$ signal; $\theta$ is a phase term associated with the $I_{p2\pm}$ signal; X is an X-direction variable; $X_0$ is a position in the X-direction at time 0; and DC is a constant offset analogous to using direct, rather than alternating, current.

The X-direction of FIG. 4 may be a scan direction of the overlay metrology system 100, such as the X-direction shown in FIG. 2 across elements 212 (gratings) of a cell 204.

In some embodiments, benefits of having a selected portion (e.g., within detected portion 334) directed to one or more detectors as shown in FIGS. 3A-4 at least includes one of: higher signal to noise ratio of the detected signal; obtaining overlap of diffraction orders related to information about the absolute grating position and overlay measurement; excluding portions (areas) of the pupil (e.g., irrelevant areas) from the detected signal that would add offset and/or add error due to contribution from unwanted diffraction orders.

In some embodiments, FIG. 3E illustrates a distribution of diffraction orders (e.g., zero order (0) annular diffraction order 336) distributed along the direction of periodicity of a grating-over-grating structure (e.g., the X direction here) in the collection pupil plane 114. In particular, the first diffraction orders 338, 340 are distributed on opposite sides of the zero order (0) annular diffraction order 336.

In another embodiment, the overlay metrology tool 102 includes one or more detectors 112 located in the overlap regions (overlapping diffraction orders) of the collection pupil plane 114. For example, a first detector may be located in a first overlap region (i.e., the top right detected portion 334) and a second detector may be located in the second overlap region (i.e., the top left detected portion 334). Each of the one or more detectors 112 may then capture a time-varying interference signal as the sample 104 is scanned. In particular, as an overlay target 202 may be scanned along a direction of periodicity of a structure (e.g., the X-direction in FIG. 2 of a grating-over-grating structure), where the phase of the +/−1 diffraction orders (e.g., diffraction orders 338, 340) relative to the zero-order diffraction (e.g., zero order (0) annular diffraction order 336) shifts in opposite directions. Accordingly, scanning the overlay target 202 by a length equal to a pitch of a grating-over-grating structure may result in a phase shift of $2\pi$ in each of the +/−1 diffraction orders (in opposite directions) and the intensity captured by each of the detectors 112 may oscillate through an interference fringe.

For example, in some embodiments, the light modulator 148 should be dynamically adjustable. For example, the light modulator 148 should be configured to be capable of adjusting the one or more selected portions of measurement light before a measurement (e.g., before receiving detection signals). For instance, before a fast-scanning measurement during a scanning mode and/or before a move and measure (MAM) measurement in a static mode.

In the same example, in a general sense, the bandwidth or response time of the detectors 112 should be sufficient to resolve the temporal frequency of the interference fringes. For example, in the case of a scan speed along a measurement direction of 10 centimeters per second and a target pitch of 1 micrometer, the interference signals will oscillate at a rate on the order of 100 kHz. In one embodiment, the detectors 112 include detectors having a bandwidth of at least 1 GHz. However, it is to be understood that this value is not a requirement. Rather, the bandwidth of the detectors 112, the translation speed along the measurement direction, and the pitch of the grating-over-grating structures may be selected together to provide a desired sampling rate of the interference signal.

In another embodiment, the one or more detectors 112 are located at (or near) a first pupil plane and the light modulator is located at a second pupil plane. For example, the second pupil plane may be, but is not limited to, the collection pupil plane 114 that light modulator 148 is in (or near) in FIGS. 1B-1C. Note that one or more collection channel beamsplitters (not shown) may be placed before or after the light modulator 148 such that at least one detector of two or more detectors 112 may be placed in a separate collection channel 144 and detect a separate detection portions of the collection pupil plane 114 (e.g., separate detection portions 334). In this regard, the first pupil plane may be in multiple physical locations (e.g., where each detector 112 is located) of a collection pupil plane split into multiple channels 144. Note that the first pupil plane (where detectors are located) is different than the second pupil plane (where light modulator is located).

Alternatively, two or more detectors may each be placed in the same collection channel 144.

In embodiments, the one or more detectors may be two or more detectors. In other embodiments, the one or more detectors may be four or more detectors. For instance, four separate detectors 112 of four or more detectors may be placed (or light directed to) such that each of the four separate detectors 112 detects a detection signal corresponding to one of the four detection portions 334 (e.g., areas of overlapping zero and first order diffraction orders) shown in FIG. 3E.

Figure 5:
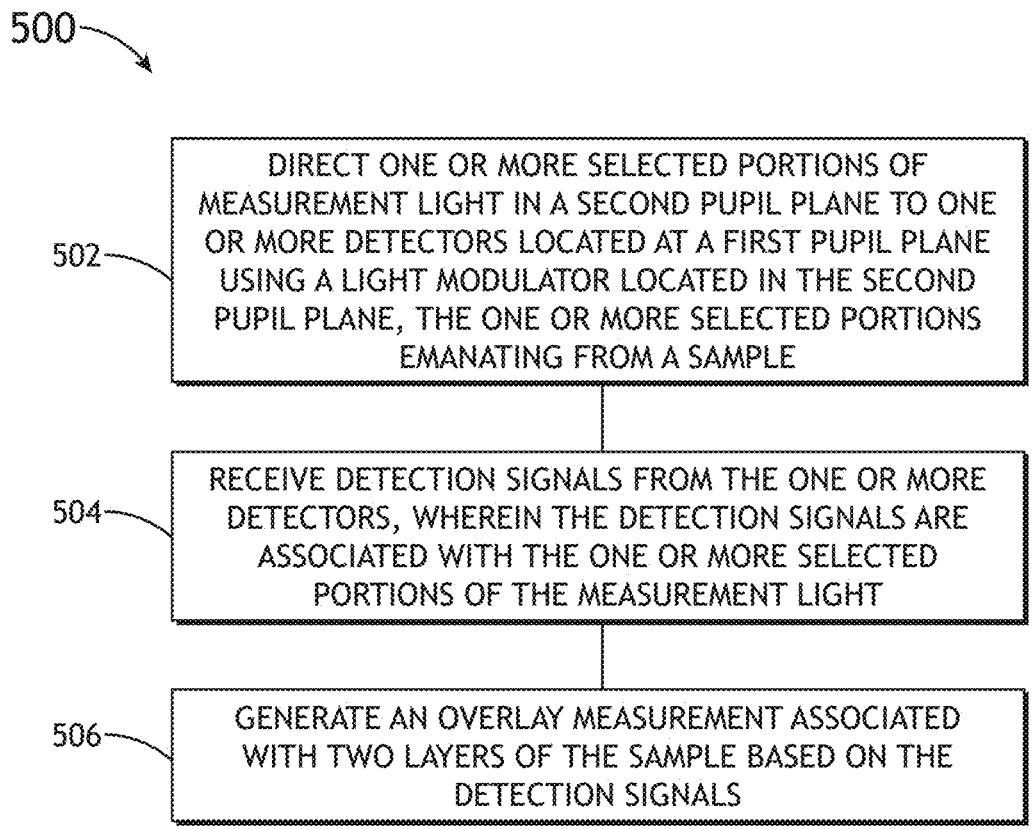
FIG. 5 illustrates a flowchart of a method for overlay metrology with a light modulator in a collection pupil plane, in accordance with one or more embodiments of the present disclosure.

Referring now to method 500 in regards to overlay metrology generally, unless otherwise noted. FIG. 5 illustrates a flowchart of a method 500 for overlay metrology with a light modulator in a collection pupil plane 114, in accordance with one or more embodiments of the present disclosure. It is noted that the embodiments and enabling technologies described previously herein in the context of the system 100 should be interpreted to extend to the method 500. It is further noted herein that the steps of method 500 may be implemented all or in part by system 100. It is further recognized, however, that the method 500 is not limited to the system 100 in that additional or alternative system-level embodiments may carry out all or part of the steps of method 500.

In one embodiment, the method 500 includes a step 502 of directing one or more selected portions of measurement light in a second pupil plane to one or more detectors located at a first pupil plane using a light modulator located in the second pupil plane, the one or more selected portions emanating from a sample. For example, the selected portions 332 as shown in FIG. 3E may be directed using a light modulator 148 located in a second collection pupil plane 114. For instance, the second collection pupil plane 114 may be any collection pupil plane 114 (e.g., collection pupil plane 114 shown in FIG. 1B). For example, a controller 122 may be configured to execute program instructions causing the light modulator 148 to direct one or more selected portions 332 of measurement light in a second pupil plane to one or more detectors located at a first pupil plane.

For example, the top right selected portion 332 of distribution 346 of FIG. 3E may be a desired area to be directed to the one or more detectors 112, but an actual distribution (not shown) may differ from distribution 346 due to a change (e.g., caused by a difference in wavelength, angle of incidence, pitch of sample, or any other possible cause) and/or a different type of selected portion (not shown) may be desired to be directed. In such an example, the light modulator 148 may be configured to (e.g., controlled by a controller to) make an adjustment (e.g., change which micromirrors of a MEMS are reflecting light to the one or more detectors) for the change and/or to select a different selected portion to be directed. For instance, the selected portions 334 of diffraction orders may have moved within the collection pupil plane (e.g., due to a change in wavelength) such that the light modulator 148 must adjust a direction to direct the measurement light towards and/or selectively block undesired areas of the measurement light such that the desired areas of the pupil plane 114 may be detected by the one or more detectors 112.

In another embodiment, the method 500 includes a step 504 of receiving detection signals from the one or more detectors, where the detection signals are associated with the one or more selected portions of the measurement light. For example, a detector 112 may be disposed in a detected area (e.g., detected area 334) of a collection pupil plane 114 such that the light (e.g., measurement light) directed by light modulator 148 is directed to (e.g., allowed to pass/transmit to, aimed at, aligned with, selectively blocked from being transmitted/reflected to, and/or the like) the one or more detectors 112. For example, light within detected area 334 associated with a detector 112 may be detected as a detection signal. For example, the controller 122 may be configured to execute program instructions causing the detection signals from the one or more detectors 112 to be received.

For example, in a scanning overlay metrology embodiment, the receiving the detection signals may occur as a sample 104 is in motion relative to the one or more detectors 112 such that the detection signals are time-varying interference signals. For example, the plotted signals of FIG. 4 may be such time-varying signals. "Time-varying signals" may mean signals obtained by an "on the fly" overlay metrology method/system obtained over time and over a scan direction (e.g., X-direction of FIG. 2). For instance, time-varying signals may be signals obtained by a fast diode and the signals may correspond to a diffraction overlapping area 334 of a collection pupil plane distribution 346 as a measurement light is scanned across one or more gratings (e.g., elements 212) of a sample 104 as shown in FIG. 2.

In another embodiment, referring back to overlay metrology generally, the method 500 includes a step 506 of generating an overlay measurement associated with two layers of the sample based on the detection signals. For example, the controller 122 may be configured to execute program instructions causing an overlay measurement associated with the two layers of the sample to be generated based on the detection signals.

For example, in a scanning overlay metrology embodiment, overlay targets and/or algorithms associated with static measurements of static samples such as, but not limited to, those described in U.S. Patent Publication No. 2019/0004439, described above, may be extended to a scanning regime.

As mentioned, it is to be understood that FIGS. 2 through 4 regarding scanning scatterometry overlay metrology are intended to be non-limiting examples and the light modulator in the collection plane may be used for collection pupil plane control of any overlay metrology technique.

Referring again to FIGS. 1A through 1C, additional components of the overlay metrology tool 102 are described in accordance with one or more embodiments of the present disclosure. For example, controller 122 and processors 124 and various optical components are described below in detail for overlay metrology generally (i.e., not specifically for scanning or static overlay metrology, unless otherwise noted).

In another embodiment, the system 100 includes a controller 122 communicatively coupled to the overlay metrology tool 102. The controller 122 may include one or more processors 124 and a memory device 126, or memory. For example, the one or more processors 124 may be configured to execute a set of program instructions maintained in the memory device 126.

The one or more processors 124 of the controller 122 may generally include any processor or processing element known in the art. For the purposes of the present disclosure, the term "processor" or "processing element" may be broadly defined to encompass any device having one or more processing or logic elements (e.g., one or more microprocessor devices, one or more application specific integrated circuit (ASIC) devices, one or more field programmable gate arrays (FPGAs), or one or more digital signal processors (DSPs)). In this sense, the one or more processors 124 may include any device configured to execute algorithms and/or instructions (e.g., program instructions stored in memory). In one embodiment, the one or more processors 124 may be embodied as a desktop computer, mainframe computer system, workstation, image computer, parallel processor, networked computer, or any other computer system configured to execute a program configured to operate or operate in conjunction with the system 100, as described throughout the present disclosure. Moreover, different subsystems of the system 100 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller or, alternatively, multiple controllers. Additionally, the controller 122 may include one or more controllers housed in a common housing or within multiple housings. In this way, any controller or combination of controllers may be separately packaged as a module suitable for integration into system 100. Further, the controller 122 may analyze or otherwise process data received from the one or more detectors 112 and feed the data to additional components within the system 100 or external to the system 100.

Further, the memory device 126 may include any storage medium known in the art suitable for storing program instructions executable by the associated one or more processors 124. For example, the memory device 126 may include a non-transitory memory medium. As an additional example, the memory device 126 may include, but is not limited to, a read-only memory, a random-access memory, a magnetic or optical memory device (e.g., disk), a magnetic tape, a solid-state drive and the like. It is further noted that memory device 126 may be housed in a common controller housing with the one or more processors 124.

In this regard, the controller 122 may execute any of various processing steps associated with overlay metrology. For example, the controller 122 may be configured to generate control signals to direct or otherwise control the overlay metrology tool 102, or any components thereof. For instance, the controller 122 may be configured to direct the translation stage 116 to translate the sample 104 along one or more measurement paths, or swaths, to scan one or more overlay targets through a measurement field of view of the overlay metrology tool 102. By way of another example, the controller 122 may be configured to receive signals corresponding to the detection signals from the one or more detectors 112. By way of another example, the controller 122 may generate correctables for one or more additional fabrication tools as feedback and/or feed-forward control of the one or more additional fabrication tools based on overlay measurements from the overlay metrology tool 102.

In another embodiment, the controller 122 captures the detection signals detected by the one or more detectors 112. The controller 122 may generally capture data such as, but not limited to, the magnitudes or the phases of the detection signals using any technique known in the art such as, but not limited to, one or more phase-locked loops. Further, the controller 122 may capture the detection signals (e.g., detection signals), or any data associated with the detection signals, using any combination of hardware (e.g., circuitry) or software techniques.

In another embodiment, the controller 122 generates (or determines) an overlay measurement between layers of an overlay target 202 (e.g., the first layer 210 and the second layer 214) along the measurement direction based on the comparison of the detection signals. For example, the controller 122 may compare the magnitudes and/or phases of the detection signals to generate an overlay measurement. For instance, U.S. Pat. No. 10,824,079 issued on Nov. 3, 2020 incorporated herein by reference in its entirety generally describes the electric field of diffracted orders in a collection pupil and further provides specific relationships between overlay and measured intensity in the pupil plane. It is contemplated herein that the systems and methods disclosed herein may extend the teachings of U.S. Pat. No. 10,824,079 to detection signals captured by detectors placed in overlap regions between 0 and +/−1 diffraction orders. In particular, it is contemplated herein that overlay on a sample may be proportional to a relative phase shift between two detection signals. In another instance, the relative intensities of the diffraction orders in the pupil plane may be extracted from the detection signals. In this way, any overlay algorithm based on relative intensity differences of diffraction orders known in the art may be applied to generate an overlay measurement.

Further, the controller 122 may calibrate or otherwise modify the overlay measurement based on known, assumed, or measured features of the sample that may also impact the detection signals such as, but not limited to, sidewall angles or other sample asymmetries.

Referring again to FIG. 1B (and FIG. 1C), various components of the overlay metrology tool 102 are described in greater detail in accordance with one or more embodiments of the present disclosure.

In one embodiment, the illumination sub-system 106 includes an illumination source 128 configured to generate at least one illumination beam 108. The illumination from the illumination source 128 may include one or more selected wavelengths of light including, but not limited to, ultraviolet (UV) radiation, visible radiation, or infrared (IR) radiation.

The illumination source 128 may include any type of illumination source suitable for providing at least one illumination beam 108. In one embodiment, the illumination source 128 is a laser source. For example, the illumination source 128 may include, but is not limited to, one or more narrowband laser sources, a broadband laser source, a supercontinuum laser source, a white light laser source, or the like. In this regard, the illumination source 128 may provide an illumination beam 108 having high coherence (e.g., high spatial coherence and/or temporal coherence). In another embodiment, the illumination source 128 includes a laser-sustained plasma (LSP) source. For example, the illumination source 128 may include, but is not limited to, a LSP lamp, a LSP bulb, or a LSP chamber suitable for containing one or more elements that, when excited by a laser source into a plasma state, may emit broadband illumination.

In another embodiment, the illumination sub-system 106 includes one or more optical components suitable for modifying and/or conditioning the illumination beam 108 as well as directing the illumination beam 108 to the sample 104. For example, the illumination sub-system 106 may include one or more illumination lenses 130 (e.g., to collimate the illumination beam 108, to relay an illumination pupil plane 120 and/or an illumination field plane 132, or the like). In another embodiment, the illumination sub-system 106 includes one or more illumination control optics 134 to shape or otherwise control the illumination beam 108. For example, the illumination control optics 134 may include, but are not limited to, one or more field stops, one or more pupil stops, one or more polarizers, one or more filters, one or more beam splitters, one or more diffusers, one or more homogenizers, one or more apodizers, one or more beam shapers, or one or more mirrors (e.g., static mirrors, translatable mirrors, scanning mirrors, or the like).

In some embodiments, the illumination sub-system 106 illuminates the sample 104 with two or more illumination beams 108. Further, the two or more illumination beams 108 may be, but are not required to be, incident on different portions of the sample 104 (e.g., different cells 204 of an overlay target 202) within a measurement field of view (e.g., a field of view of the objective lens 136). It is contemplated herein that the two or more illumination beams 108 may be generated using a variety of techniques. In one embodiment, the illumination sub-system 106 includes two or more apertures at an illumination field plane 132. In another embodiment, the illumination sub-system 106 includes one or more beamsplitters to split illumination from the illumination source 128 into the two or more illumination beams 108. In another embodiment, at least one illumination source 128 generates two or more illumination beams 108 directly. In a general sense, each illumination beam 108 may be considered to be a part of a different illumination channel regardless of the technique in which the various illumination beams 108 are generated.

The collection sub-system 110 may include one or more optical elements suitable for modifying and/or conditioning the collected light 138 from the sample 104. In one embodiment, the collection sub-system 110 includes one or more collection lenses 140 (e.g., to collimate the illumination beam 108, to relay pupil and/or field planes, or the like), which may include, but are not required to include, the objective lens 136. In another embodiment, the collection sub-system 110 includes one or more collection control optics 142 to shape or otherwise control the collected light 138. For example, the collection control optics 142 may include, but are not limited to, one or more field stops, one or more pupil stops, one or more polarizers, one or more filters, one or more beam splitters, one or more diffusers, one or more homogenizers, one or more apodizers, one or more beam shapers, or one or more mirrors (e.g., static mirrors, translatable mirrors, scanning mirrors, or the like). In another example, the collection sub-system 110 may include one or more collection field planes 150. Note that the position of the light modulator may be placed before and/or after the collection control optics 142 and/or one or more collection lenses 140 and is not limited by the positions shown in FIG. 1B or FIG. 1C.

In another embodiment, the collection sub-system 110 includes two or more collection channels 144, each with a separate detector 112 (or multiple detectors 112). For example, the overlay metrology tool 102 may include one or more beamsplitters 146 arranged to split the collected light 138 into the collection channels 144. Further, the beamsplitters 146 may be polarizing beamsplitters, non-polarizing beamsplitters, or a combination thereof.

In one embodiment, multiple collection channels 144 are configured to collect light from multiple illumination beams 108 on the sample 104. For example, in the case that an overlay target 202 has two or more cells 204 distributed in a direction different than a scan direction, the overlay metrology tool 102 may simultaneously illuminate the different cells 204 with different illumination beams 108 and simultaneously capture detection signals associated with each illumination beam 108. Additionally, in some embodiments, multiple illumination beams 108 directed to the sample 104 may have different polarizations. In this way, the diffraction orders associated with each of the illumination beams 108 may be separated. For example, polarizing beamsplitters 146 may efficiently separate the diffraction orders associated with the different illumination beams 108. By way of another example, polarizers may be used in one or more collection channels 144 to isolate desired diffraction orders for measurement.

Referring again to FIG. 1A, it is noted herein that the one or more components of system 100 may be communicatively coupled to the various other components of system 100 in any manner known in the art. For example, the one or more processors 124 may be communicatively coupled to each other and other components via a wireline (e.g., copper wire, fiber optic cable, and the like) or wireless connection (e.g., RF coupling, IR coupling, WiMax, Bluetooth, 3G, 4G, 4G LTE, 5G, and the like). By way of another example, the controller 122 may be communicatively coupled to one or more components of overlay metrology tool 102 via any wireline or wireless connection known in the art.

In one embodiment, the one or more processors 124 may include any one or more processing elements known in the art. In this sense, the one or more processors 124 may include any microprocessor-type device configured to execute software algorithms and/or instructions. In one embodiment, the one or more processors 124 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 124. In general, the term "processor" may be broadly defined to encompass any device having one or more processing elements, which execute program instructions from memory 126. Moreover, different subsystems of the system 100 may include processor or logic elements suitable for carrying out at least a portion of the steps described throughout the present disclosure. Therefore, the above description should not be interpreted as a limitation on the present disclosure but merely an illustration.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

We claim:

1. An overlay metrology system comprising:
   an illumination source configured to generate an illumination beam, wherein the illumination beam comprises one or more illumination beams, wherein each of the one or more illumination beams are spatially limited to illuminate a particular cell of an overlay target;
   a collection sub-system comprising:
     an objective lens configured to collect measurement light emanating from a sample in response to the illumination beam according to a metrology recipe, wherein the sample includes the overlay target comprising at least two layers according to the metrology recipe;
     one or more detectors located at a first pupil plane; and
     a light modulator located at a second pupil plane, wherein the light modulator is configured to direct one or more selected portions of the measurement light in the second pupil plane to the one or more detectors; and
   a controller communicatively coupled to the collection sub-system, the controller including one or more processors configured to execute program instructions causing the one or more processors to execute the metrology recipe by:
     receiving detection signals from the one or more detectors, wherein the detection signals are associated with the one or more selected portions of the measurement light directed to the one or more detectors; and
     generating an overlay measurement associated with the at least two layers of the sample based on the detection signals.

2. The overlay metrology system of claim 1, wherein, according to the metrology recipe, the receiving the detection signals occurs as the sample is in motion relative to the one or more detectors such that the detection signals are time-varying interference signals.

3. The overlay metrology system of claim 1, wherein the light modulator is configured to be dynamically adjustable to provide dynamic selection of the one or more selected portions of the measurement light directed to the one or more detectors.

4. The overlay metrology system of claim 1, wherein the light modulator comprises:
   at least one of a spatial light modulator, a micro-electro-mechanical system (MEMS) device, or a deformable optic.

5. The overlay metrology system of claim 1, wherein the one or more detectors comprises:
   two or more detectors distributed across the first pupil plane.

6. The overlay metrology system of claim 5,
   wherein, according to the metrology recipe, the receiving the detection signals occurs as the sample is in motion relative to the two or more detectors such that the detection signals are time-varying interference signals,
   wherein the light modulator is configured to be dynamically adjustable to provide dynamic selection of the one or more selected portions of the measurement light directed to the two or more detectors, and
   wherein the light modulator comprises: at least one of a spatial light modulator, a micro-electro-mechanical system (MEMS) device, a digital light processing (DLP) device, or a deformable optic.

7. The overlay metrology system of claim 6, wherein at least one of the two or more detectors comprises:
   at least one of a photodiode, an avalanche photodiode, or a photomultiplier tube.

8. The overlay metrology system of claim 6, wherein the one or more selected portions of the measurement light include at least one of:
   selected diffraction orders; or
   overlapping diffraction orders.

9. The overlay metrology system of claim 1, wherein the one or more selected portions of the measurement light directed to the one or more detectors is reflected from the light modulator.

10. The overlay metrology system of claim 1, wherein the one or more selected portions of the measurement light directed to the one or more detectors is transmitted by the light modulator.

11. The overlay metrology system of claim 1, wherein the one or more detectors generates the detection signals as the sample is static.

12. The overlay metrology system of claim 1, wherein the one or more detectors comprises:
   a multi-pixel sensor.

13. The overlay metrology system of claim 12, wherein the multi-pixel sensor comprises:
   at least one of a charge-coupled device (CCD) or a complementary metal-oxide-semiconductor (CMOS) device.

14. The overlay metrology system of claim 1, wherein sensor elements of the one or more detectors underfill the first pupil plane, wherein the light modulator directs the one or more selected portions of the measurement light to locations of the sensor elements.

15. The overlay metrology system of claim 1, wherein grating structures on the at least two layers of the sample in the overlay target have a common pitch.

16. The overlay metrology system of claim 1, wherein grating structures on the at least two layers of the sample in the overlay target have different pitches, wherein grating-over-grating structures formed from the grating structures are Moiré structures.

17. The overlay metrology system of claim 16, wherein the illumination beam is annular, wherein the one or more selected portions of the measurement light directed to the one or more detectors include regions of overlap of annular diffraction orders from the Moiré structures.

18. The overlay metrology system of claim 1, wherein the illumination beam is circular, wherein the one or more selected portions of the measurement light directed to the one or more detectors include regions of overlap of circular diffraction orders from Moiré structures on the at least two layers of the sample.

19. An overlay metrology system with field plane detectors comprising:
an illumination source configured to generate an illumination beam, wherein the illumination beam comprises one or more illumination beams, wherein each of the one or more illumination beams are spatially limited to illuminate a particular cell of an overlay target;
a collection sub-system comprising:
an objective lens configured to collect measurement light emanating from a sample in response to the illumination beam according to a metrology recipe, wherein the sample includes the overlay target comprising at least two layers according to the metrology recipe;
one or more detectors located at a collection field plane of the collection sub-system; and
a light modulator located at a collection pupil plane, wherein the light modulator is configured to direct one or more selected portions of the measurement light in the collection pupil plane to the one or more detectors; and
a controller communicatively coupled to the collection sub-system, the controller including one or more processors configured to execute program instructions causing the one or more processors to execute the metrology recipe by:
receiving detection signals from the one or more detectors, wherein the detection signals are associated with the one or more selected portions of the measurement light directed to the one or more detectors; and
generating an overlay measurement associated with the at least two layers of the sample based on the detection signals.

20. The overlay metrology system of claim 19, wherein the receiving the detection signals occurs while the sample is static, and
wherein the one or more detectors include at least one of a charge-coupled device (CCD) or a complementary metal-oxide-semiconductor (CMOS) device.

21. A method for overlay metrology, the method comprising:
illuminating a sample with one or more illumination beams, wherein each of the one or more illumination beams are spatially limited to illuminate a particular cell of an overlay target;
directing one or more selected portions of measurement light in a second pupil plane to one or more detectors located at a first pupil plane using a light modulator located in the second pupil plane, the one or more selected portions emanating from the sample;
receiving detection signals from the one or more detectors, wherein the detection signals are associated with the one or more selected portions of the measurement light; and
generating an overlay measurement associated with two layers of the sample based on the detection signals.

22. The method of claim 21, wherein the receiving the detection signals occurs as the sample is in motion relative to the one or more detectors such that the detection signals are time-varying interference signals.

23. The method of claim 21, the directing the one or more selected portions of the measurement light comprises:
dynamically adjusting the light modulator to provide dynamic selection of the one or more selected portions of the measurement light directed to the one or more detectors.

24. The method of claim 21, wherein the light modulator comprises:
at least one of a spatial light modulator, a micro-electromechanical system (MEMS) device, or a deformable optic.

25. The method of claim 21, wherein the one or more selected portions of the measurement light directed to the one or more detectors is reflected from the light modulator.

26. The method of claim 21, wherein the one or more selected portions of the measurement light directed to the one or more detectors is transmitted by the light modulator.

* * * * *